(12) United States Patent
Yovino

(10) Patent No.: US 11,700,880 B2
(45) Date of Patent: Jul. 18, 2023

(54) COLLAPSIBLE SUN-POWERED SMOKING PIPE

(71) Applicant: David John Yovino, San Rafael, CA (US)

(72) Inventor: David John Yovino, San Rafael, CA (US)

(73) Assignee: David John Yovino, San Rafael, CA (US)

( * ) Notice: Subject to any disclaimer, the term of this patent is extended or adjusted under 35 U.S.C. 154(b) by 410 days.

(21) Appl. No.: 16/685,068

(22) Filed: Nov. 15, 2019

(65) Prior Publication Data

US 2021/0145048 A1 May 20, 2021

(51) Int. Cl.
*A24F 1/00* (2006.01)
*A24F 9/00* (2006.01)
*A24F 1/30* (2006.01)
*G02B 7/02* (2021.01)

(52) U.S. Cl.
CPC .................. *A24F 9/00* (2013.01); *A24F 1/00* (2013.01); *A24F 1/30* (2013.01); *G02B 7/023* (2013.01)

(58) Field of Classification Search
None
See application file for complete search history.

(56) References Cited

U.S. PATENT DOCUMENTS

| | | | |
|---|---|---|---|
| 1,557,605 A * | 10/1925 | O'Meara | G02B 25/005 |
| | | | 359/817 |
| 4,076,014 A | 2/1978 | Wiquel | |
| 4,254,761 A | 3/1981 | Armas | |
| 4,610,240 A | 9/1986 | Burch | |
| 5,927,272 A | 7/1999 | Robertson | |
| 6,644,303 B1 | 11/2003 | Worthington | |
| 10,344,976 B2 | 7/2019 | Bolger | |
| 2006/0054172 A1 | 3/2006 | Ucci | |
| 2016/0109127 A1 | 4/2016 | Bolger | |

FOREIGN PATENT DOCUMENTS

| | | |
|---|---|---|
| CH | 614515 A5 | 11/1979 |
| CN | 103807877 A | 5/2014 |
| CN | 105876859 A | 8/2016 |
| DE | 222250 C | 8/1910 |

(Continued)

OTHER PUBLICATIONS

Thesuntoken, https://www.instagram.com/p/B0wEneRBAMs/, (Aug. 4, 2019) (Year: 2019).*

(Continued)

*Primary Examiner* — Kelly M Gambetta
*Assistant Examiner* — Katherine A Will
(74) *Attorney, Agent, or Firm* — Cruz-Abrams Seigel LLC; Justin McNaughton

(57) ABSTRACT

A sun-powered smoking pipe with a lens suspended by two arms, whose arms hold the lens at a fixed distance from the pipe's bowl, the distance being equal to the focal length of the lens. The arms have equal lengths and swivel in tandem both at their attachment points to the lens and at their attachment points to the pipe so that the entire device can be folded flat quickly. The only calibration required by a user is to rotate the lens so that the focal point is aimed inside the bowl when the lens is held in the direction of the sun.

18 Claims, 27 Drawing Sheets

(56) References Cited

FOREIGN PATENT DOCUMENTS

| | | |
|---|---:|---|
| DE | 314672 C | 10/1919 |
| DE | 202004008698 U1 | 4/2005 |
| EP | 0052443 A1 | 5/1982 |
| ES | 2341198 B1 | 4/2011 |
| FR | 955614 A | 1/1950 |
| FR | 2309808 A1 | 11/1977 |
| FR | 2414691 A1 | 8/1979 |
| FR | 2441801 A1 | 6/1980 |
| GB | 2335261 A | 12/2001 |

OTHER PUBLICATIONS

Campos, Hector, "The Sun Token," posted at www.suntoken.com, online URL https://www.suntoken.com/single-post/2017/09/26/New-Borosilicate-Glass-Solar-Domes ( Sep. 26, 2017).

\* cited by examiner

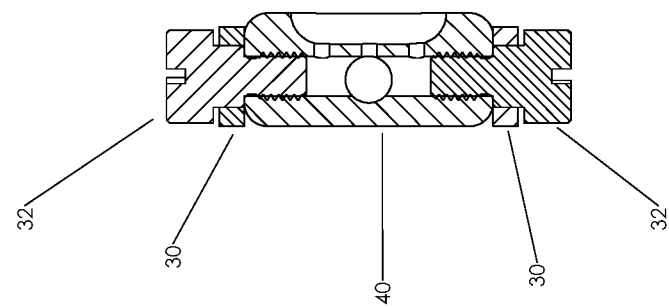
FIG. 3.2
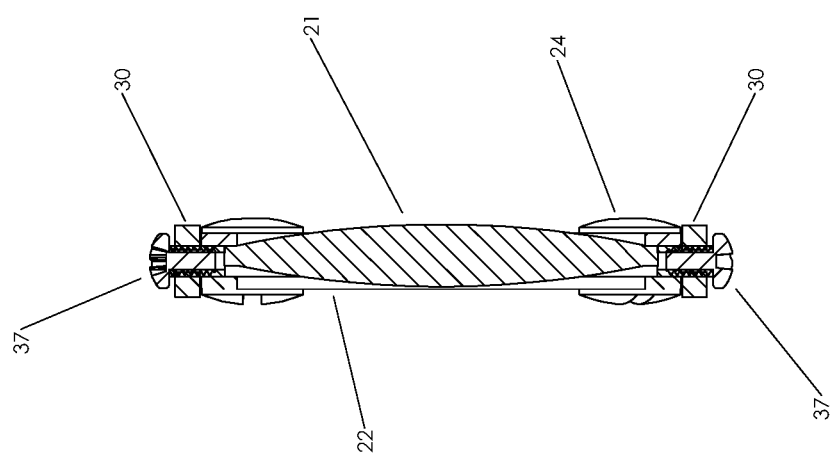
FIG. 3.1

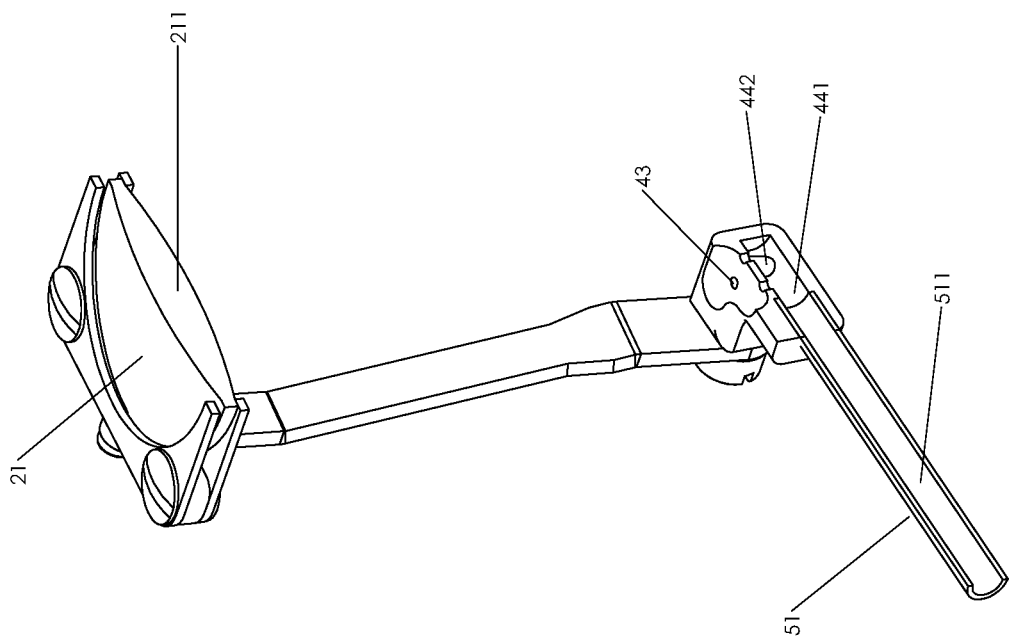
FIG. 12.1

COLLAPSIBLE SUN-POWERED SMOKING PIPE

BACKGROUND OF THE INVENTION

The disclosed device provides an easy-to-use sun-powered smoking pipe or apparatus that can be used without any accelerants or chemicals to smoke a substrate quickly and efficiently in a controlled manner. Although lenses have been used to focus parallel light rays from the sun to ignite a substrate for a long time these devices are typically awkward to hold, require the user to employ a great deal of dexterity to hold a magnifying glass at the proper distance from the substrate, and are not easily collapsed and stored in a coat or pants pocket without having to recalibrate the device at the next use. Although many lighters exist for lighting pipes, most of them use an accelerant or other chemical that the smoker breathes in while smoking. Additionally, using a lighter with accelerant typically requires both hands to start as the lighter is typically a separate device from the pipe. What would be useful for smokers is an easy-to-use—even one-handed—pipe for smoking a substrate that can be quickly and reliably started, can be collapsed and deployed easily without calibration and uses no accelerants.

SUMMARY OF THE INVENTION

The device is a sun-powered smoking pipe with a lens suspended by two arms, whose arms hold the lens at a fixed distance from the pipe's bowl, the distance being equal to the focal length of the lens. The arms have equal lengths and swivel in tandem both at their attachment points to the lens and at their attachment points to the pipe so that the entire device can be folded flat quickly. The only calibration required by a user is to rotate the lens so that the focal point is aimed inside the bowl when the lens is held in the direction of the sun. When the lens is held in the direction of the sun and the focal point of the lens is directed at the bowl, the lens focuses the light from the sun on the bowl and can quickly heat the substrate in the bowl to 500 degrees Celsius (932 degrees Fahrenheit) or more. When collapsed, the device folds flat and has a profile smaller than a typical smartphone, which can be easily placed in a pocket without affecting the device's calibration of the distance between the lens and the bowl when the pipe is reopened.

BRIEF DESCRIPTION OF DRAWINGS

FIG. 3.1 is a cutaway view from FIG. 3 of an embodiment of the device in a folded position.

FIG. 3.2 is a cutaway view from FIG. 3 of an embodiment of the device in a folded position.

FIG. 12.1 is a cutaway view from FIG. 12 of an embodiment of the device in an unfolded position.

DETAILED DESCRIPTION

Compact Embodiments

Figure 1:
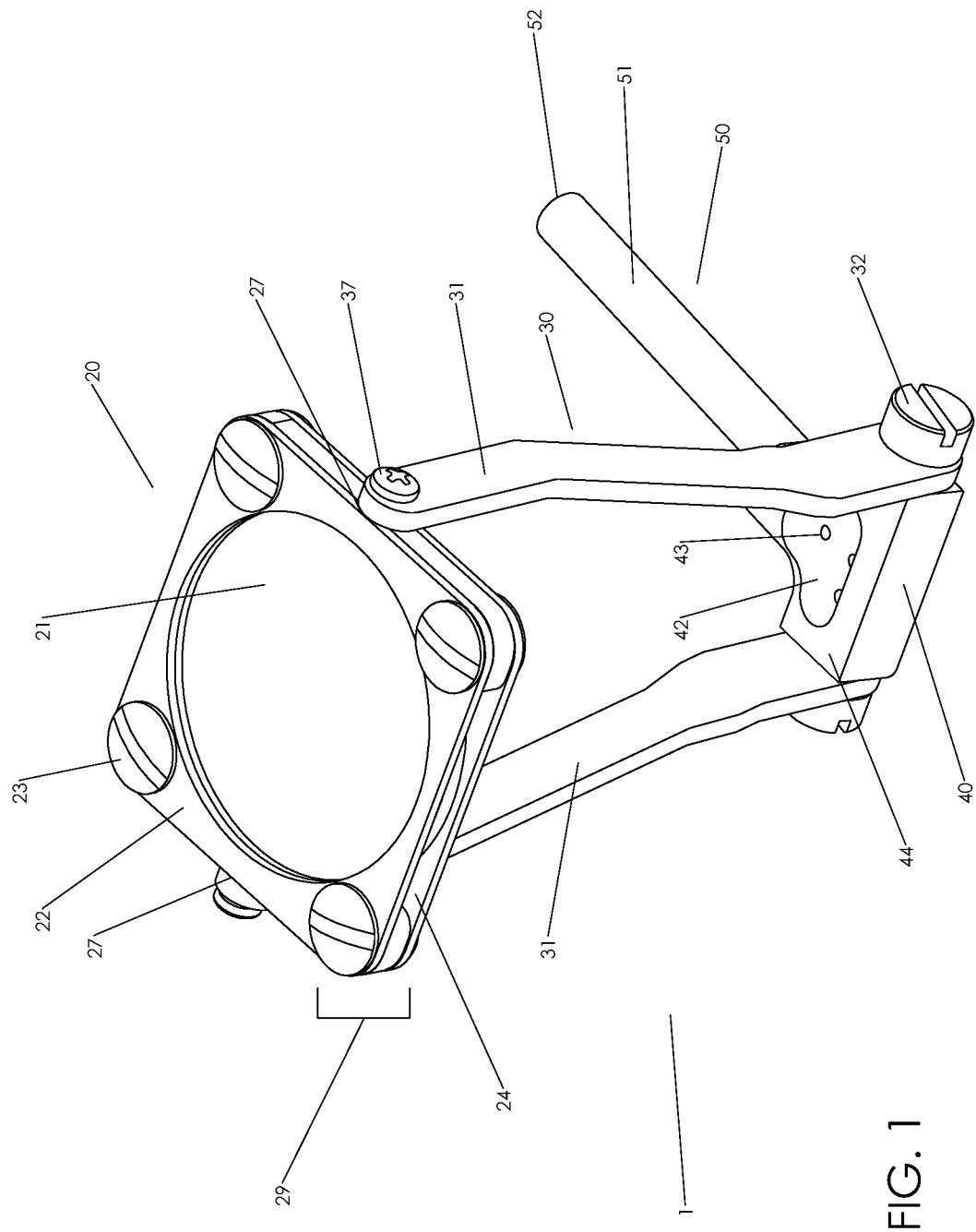
FIG. 1 is a perspective view of an embodiment of the device in an unfolded position.

FIG. 1 shows one embodiment of the device comprising a lens assembly 20, an arm assembly 30, a bowl assembly 40, and a stem assembly 50.

Figure 12:
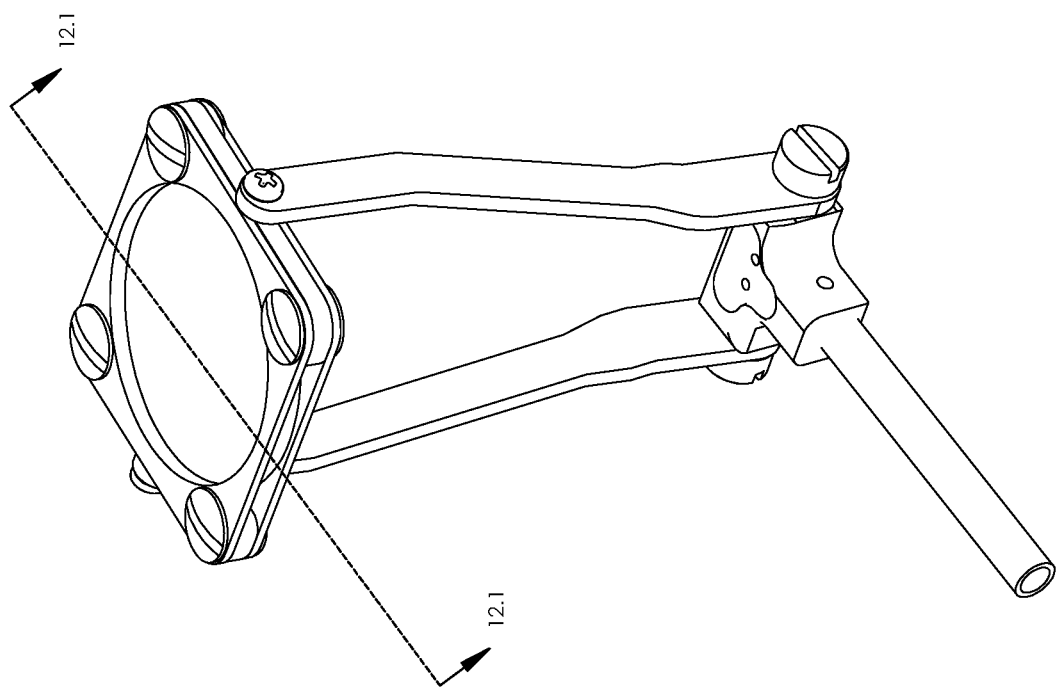
FIG. 12 is a perspective view of an embodiment of the device in an unfolded position.
Figure 13:
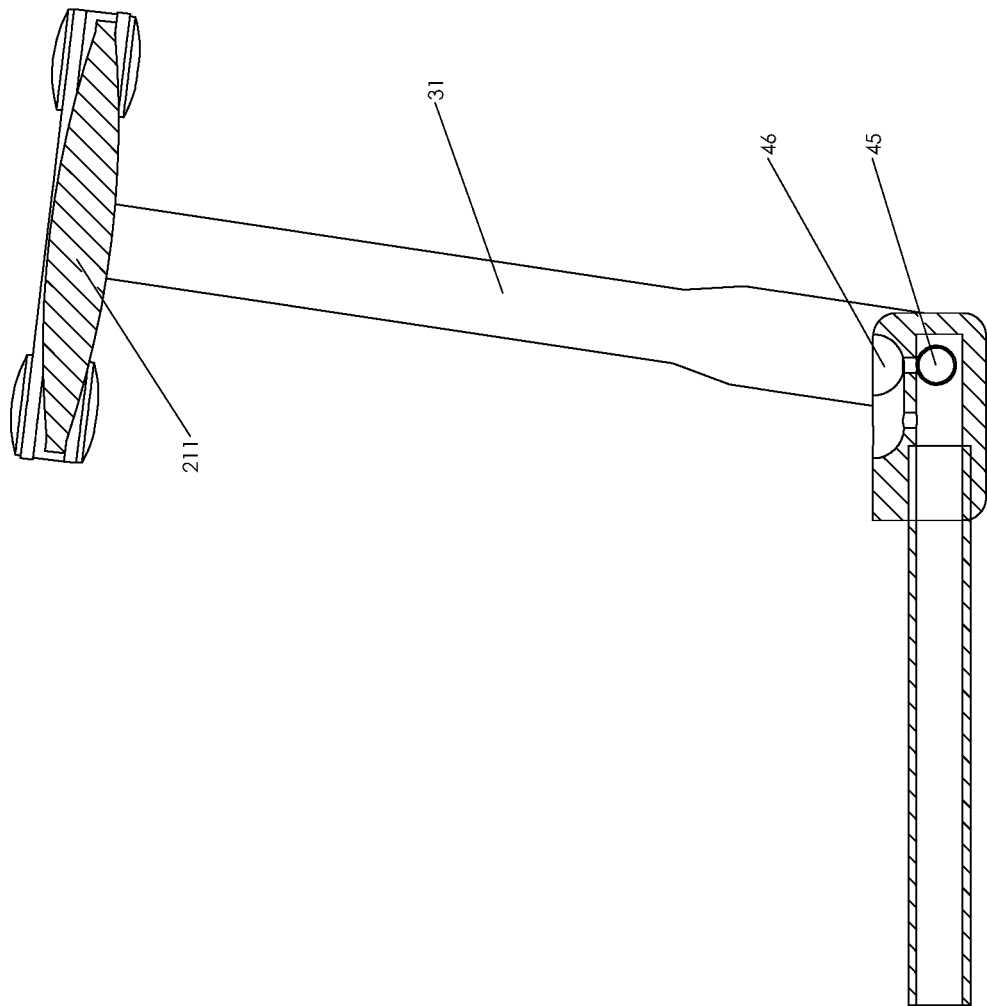
FIG. 13 is a cutaway view of an embodiment of the device in an unfolded position.

The lens assembly 20 can, in one embodiment, have a lens 21 and in another embodiment have a lens 21 with a frame 29. As shown in FIG. 1, in one embodiment, the frame 29 has an upper frame 22 and a lower frame 24 that sandwich the lens 21 and hold it in place by fasteners 23. The lens 21 is typically a spherical, convex lens. Although multiple lenses can be used, typically, a single lens is sufficient. In the embodiment of FIG. 1, the frame 29 and lens assembly 20 are square-shaped. In other embodiments, the frame 29 and lens assembly 20 can be rectangular, circular, ovular, or any other shape. The lens assembly 20 further comprises attachment points 27 on opposite sides of the frame 29 (in an embodiment with a frame) or on opposite sides of the lens (in an embodiment without a frame). The lens 21 has an optical center, a diameter, and an outer edge. In one embodiment, the outer edge of the lens 21 has attachment points on opposite sides of the outer edge. In the embodiment shown in FIG. 1, the frame 29 has attachment sides and non-attachment sides, and attachment points 27 on the attachment sides. In one embodiment, each side has an edge and the edges of the attachment sides have an attachment point and the edges of the non-attachment sides can be equidistant from the optical center or one or more of the non-attachment sides can be further away from the optical center than the other sides. As shown in FIG. 12 and cutaway FIG. 12.1, the lens frame 29 sandwiches the lens 21 holding it firmly in place. In some embodiments, the lens frame 29 is a unitary piece. In some embodiments, the frame 29 is omitted and the arms 31 attach directly to the lens 21.

Figure 5:
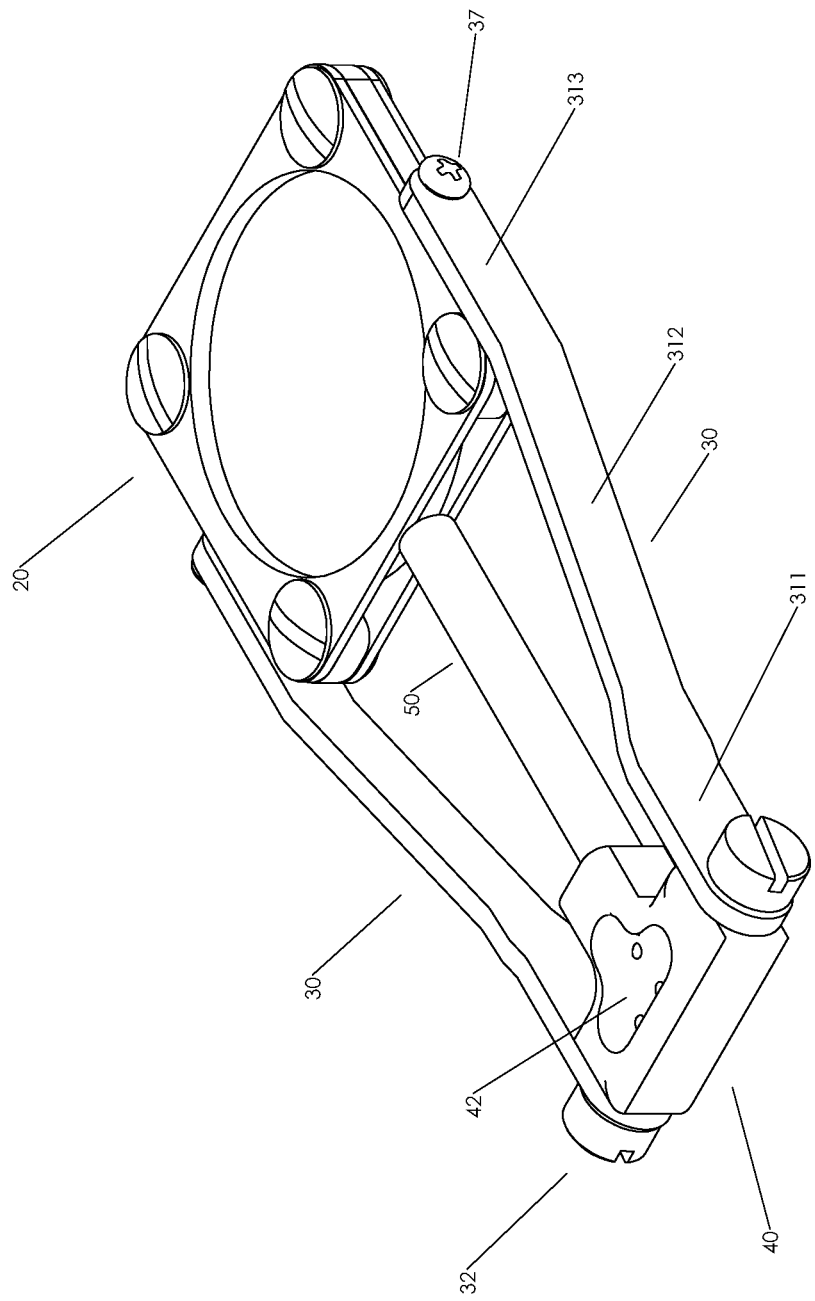
FIG. 5 is a perspective view of an embodiment of the device in a folded position.

As shown in FIG. 1, in one embodiment, the arm assembly 30 comprises two arms or swingarms 31 having equal lengths. Each arm 31 has a first end and a second end, and the first end has an attachment point 27 where it rotatably connects to the edge of lens 21 or to the lens assembly 20 on the attachment sides of the lens assembly 20. The second end of each arm rotatably connects to the bowl assembly 40 and is held in place by fasteners 32. In one embodiment, the width of the bowl assembly 40 between the arms 31 is less than the width between the attachment points 27 of the lens assembly 20 and so the arms curve or bend as they extend outwards from the bowl assembly 40 to the lens assembly 20. FIG. 5 shows a different view of one embodiment of the pipe 1 having an arm assembly 30 with a narrowest region 311 of the arm assembly 30 attached to the bowl assembly 40 and an expanding region 312 of the arm assembly 30 widening out to the widest part 313 of the arm assembly 30 where the arm assembly 30 attaches to the lens assembly 20. A lens fastener 37 can attach the first end of the arms 31 to the lens assembly 20 at the attachment points 27.

As shown in FIG. 1, in one embodiment, the bowl assembly 40 has a bowl 42, an internal passageway 442 (see FIG. 10), attachment points for the arm assembly, and an attachment point for the stem assembly. In one embodiment, the bowl 42 has a focus area and at least one screening hole 43. The focus area location can vary but is typically between the top surface of the bowl assembly (or the outer rim of the bowl) and the bottom of the bowl. The screening hole(s) 43 are small enough that materials placed in the bowl 42 will not fall through the screening holes 43, but are large enough that air will flow through the screening holes 43. As shown in FIG. 5, the bowl 42 can be an irregular shape, such as clover-shaped.

Figure 6:
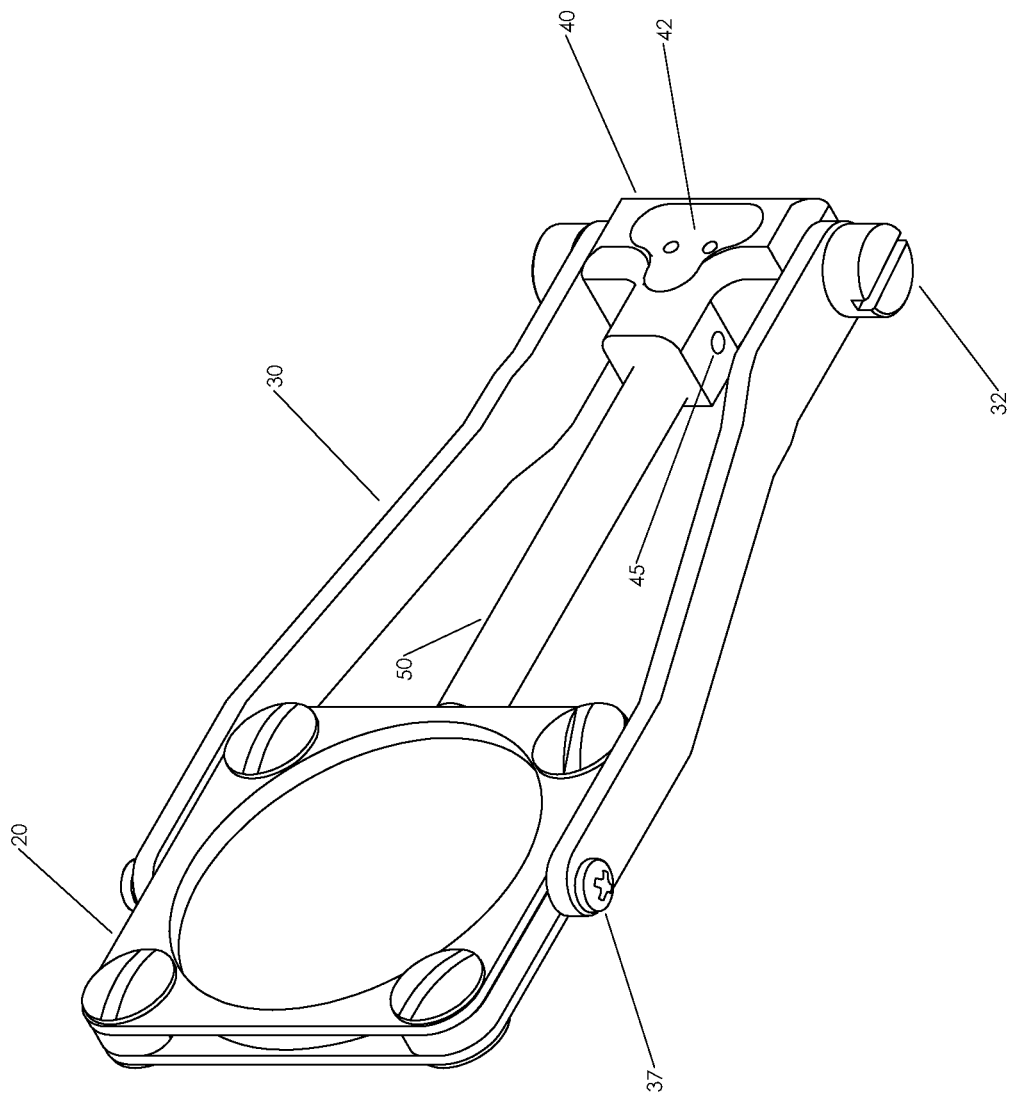
FIG. 6 is a perspective view of an embodiment of the device in an unfolded position.

As shown in FIG. 1, the stem assembly 50 can be a hollow tube having two ends, a user end 52 that is accessible to a user and a bowl end that attaches to the bowl assembly 40. In other embodiment, the stem assembly 50 can comprise a tube and a mouthpiece. In another embodiment, the tube itself acts as the mouthpiece. In some embodiments, a shield can be attached to the stem assembly or other components. As shown in FIG. 6, in some embodiments the stem assembly 50 and the bowl assembly 40 are a unitary piece rather than being separate components. As shown in FIG. 12, in one embodiment, the stem 51 slides into the stem port 441. In some embodiments, the stem assembly 50 is simply a stem.

Figure 2:
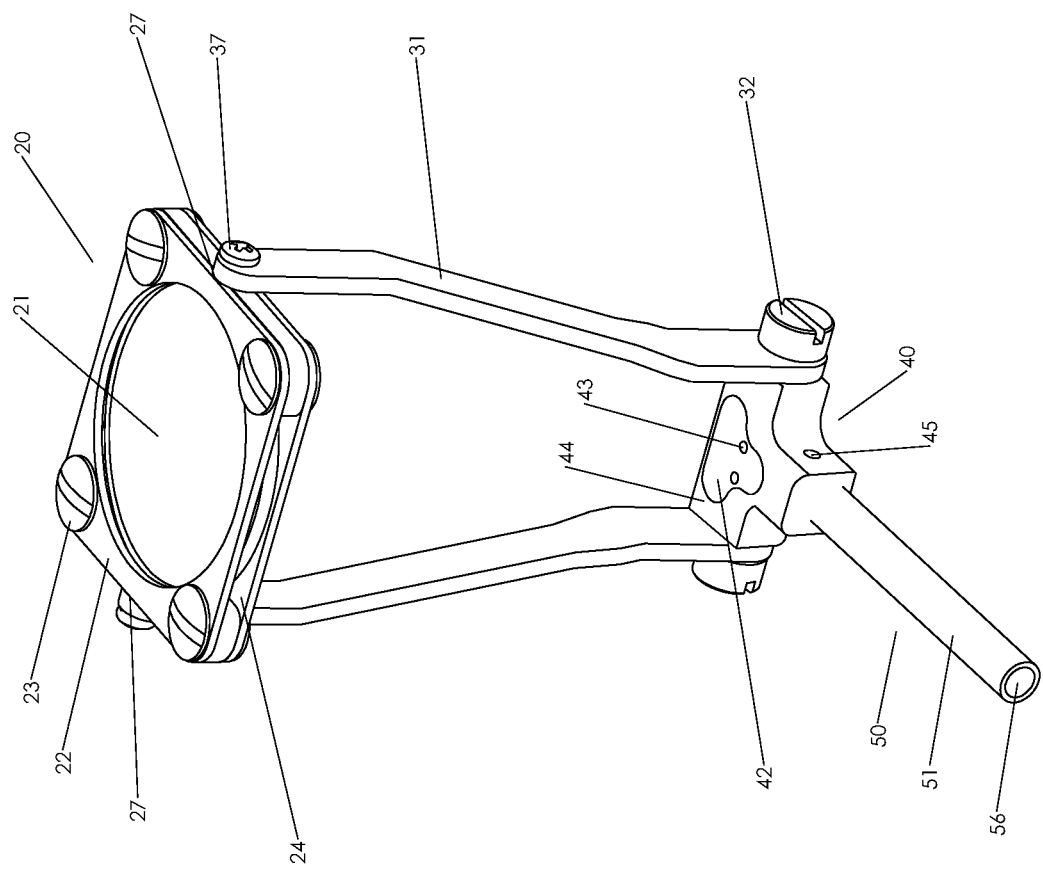
FIG. 2 is a perspective view of an embodiment of the device in an unfolded position.

FIG. 2 shows the same embodiment as FIG. 1 except that it shows the pipe 1 from the opposite side. From this perspective, in one embodiment, a fastener hole 45 can be seen. In an embodiment with a fastener hole 45, a pin, screw or other fastener is inserted into the fastener hole 45 to hold the stem in place in the bowl assembly. In an embodiment with a fastener hole 45 and fastener, the stem can be removed from the bowl assembly for cleaning or to replace the stem. In an embodiment where the stem and bowl assembly are a unitary piece, there would be no fastener hole. Additionally, the hollow opening 56 to the hollow stem 51 can be seen.

Figure 3:
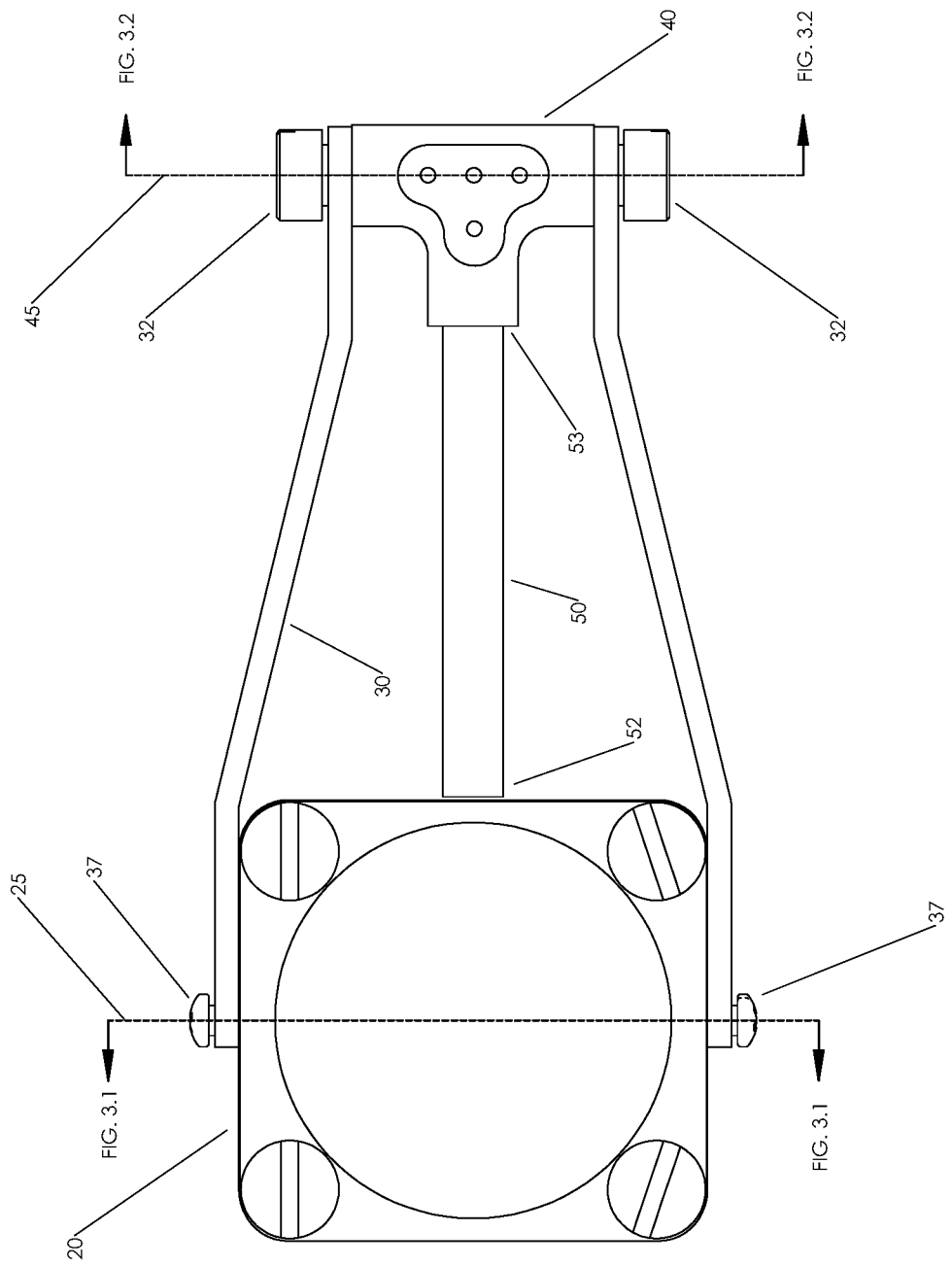
FIG. 3 is a top view of an embodiment of the device in a folded position.

FIG. 1 shows the pipe 1 in an operational position with the lens 21 extended above the bowl. FIG. 2 shows the pipe 1, also in an operational position with the lens 21 extended above the bowl. FIG. 3 shows one embodiment of the pipe 1 in a folded position. In one embodiment, the lens assembly 20 rotates on an axis (depicted as 45) so that the lens 21 rotates around the bowl assembly 40. The lens assembly 20 also rotates on its own axis (depicted as 25) at the lens fasteners 37. In the folded position, the lens assembly 20 is rotated so that it is parallel to the arm assembly 30, the bowl assembly 40, and the stem assembly 50.

In the embodiment shown in FIG. 3, arms are longer than the combined length of the stem plus the radius of the lens. In the embodiment shown in FIG. 3, the combined distance between the lens' optical center to the bowl's axis 45 is greater than the length from stem's user end 52 to the bowl's axis 45 plus the distance from the frame's furthest non-attachment side to the lens's optical center (or the lens' axis 25). In other words, when folded, the arms 31 are long enough that the lens assembly 20 can rotate parallel to the arm assembly 30 without obstructing the bowl assembly 40 and stem assembly 50 from also rotating parallel to the arm assembly 30. In one embodiment, the lens 21 has a radius, and each of the swingarms has an attachment point at the first end and an attachment point at the second end. In such an embodiment, the distance between the attachment point at the first end of each swingarm and the attachment point at the second end of each swingarm is greater than the radius of the lens plus the length of the stem. This allows the stem assembly and the lens assembly to fold substantially flat between in between the swingarms. Said yet another way, there is a first distance between the arm attachment points of the bowl assembly and the axis of the lens assembly and a second distance between the axis of the lens assembly and the edge of the frame, and a third distance between the attachment points of the bowl assembly and the user end of the stem. In such an embodiment, the first distance is greater than sum of the second distance and the third distance, and the stem assembly and the lens assembly fold substantially flat in between the swingarms.

Figure 4:
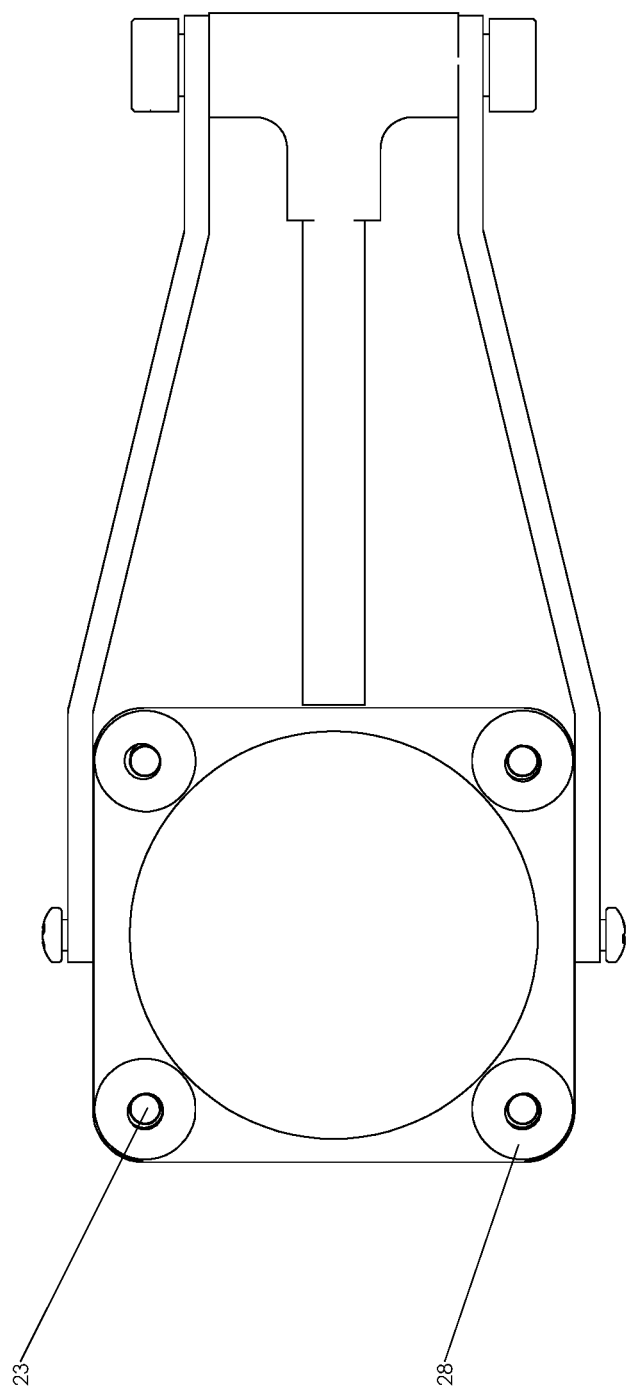
FIG. 4 is a bottom view of an embodiment of the device in a folded position.

FIG. 4 provides a bottom view of the folded pipe 1. The pipe can also be folded so that the stem extends way from the lens but this alternative flat configuration is not compact.

FIG. 3.1 shows a cutaway view of the lens assembly of one embodiment in which the frame 29 has an upper frame and a lower frame 24 sandwiching the lens 21. This cutaway view shows the relative size of the components of the lens assembly 20 in one embodiment.

FIG. 3.2 shows a cutaway view of the folded pipe and illustrates the relative size of the internal openings of the bowl assembly 40 in one embodiment.

Figure 8:
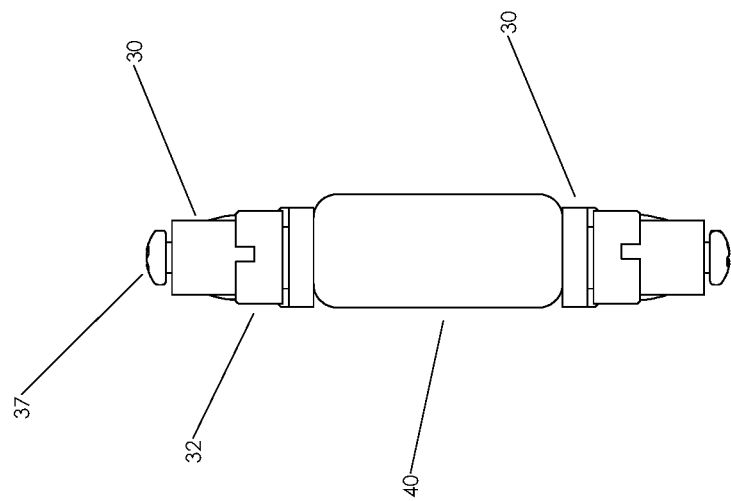
FIG. 8 is an end view of an embodiment of the device in a folded position
Figure 7:
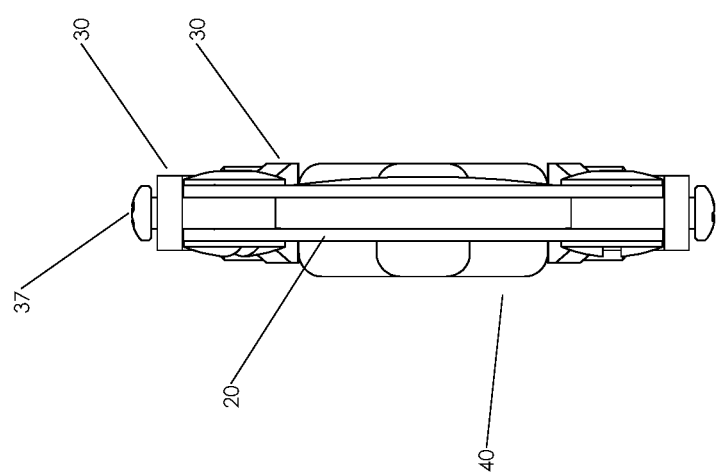
FIG. 7 is an end view of an embodiment of the device in a folded position.

FIGS. 7 and 8 provide opposite end views of the folded pipe 1. When folded, the entire pipe 1 is substantially flat. In the embodiment shown in FIG. 7, the bowl assembly 40 is the thickest part of the pipe 1. In other embodiments, the arms 31 or the lens assembly 20 may be the thickest parts.

Figure 9:
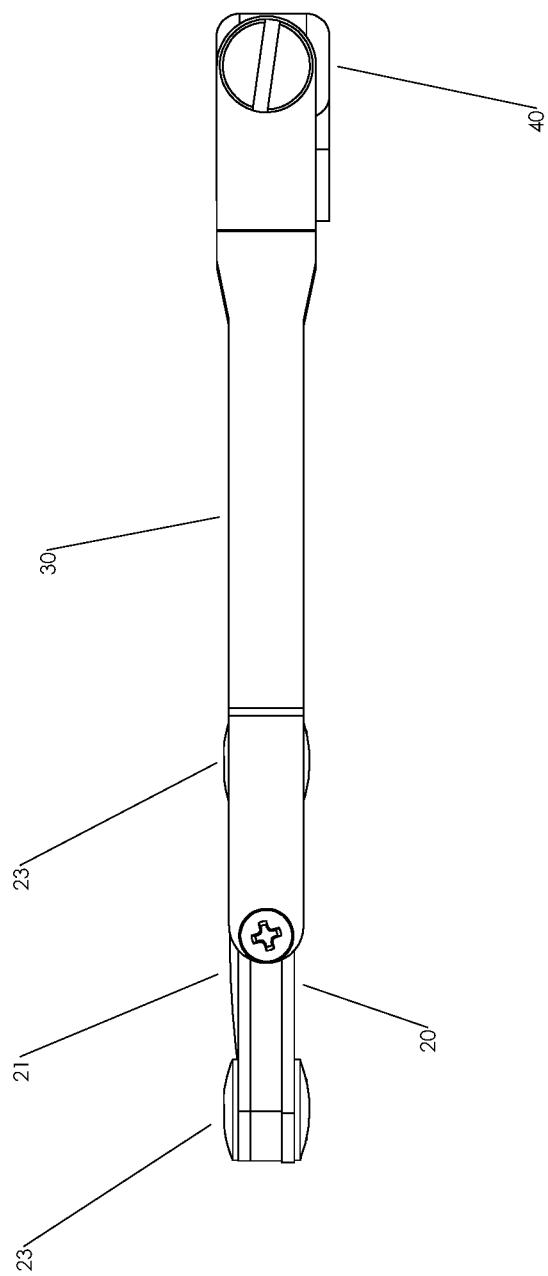
FIG. 9 is side view of an embodiment of the device in a folded position

FIG. 9 shows a side view of the folded pipe 1 that is substantially flat.

Figure 10:
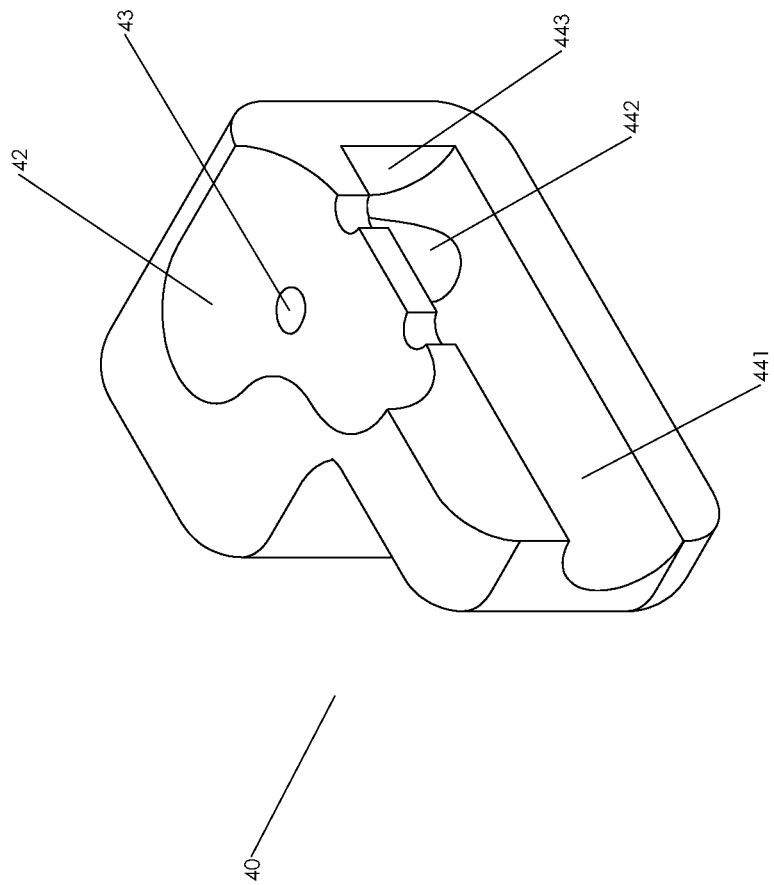
FIG. 10 is a perspective cutaway view of an embodiment of the bowl assembly of the device.
Figure 11:
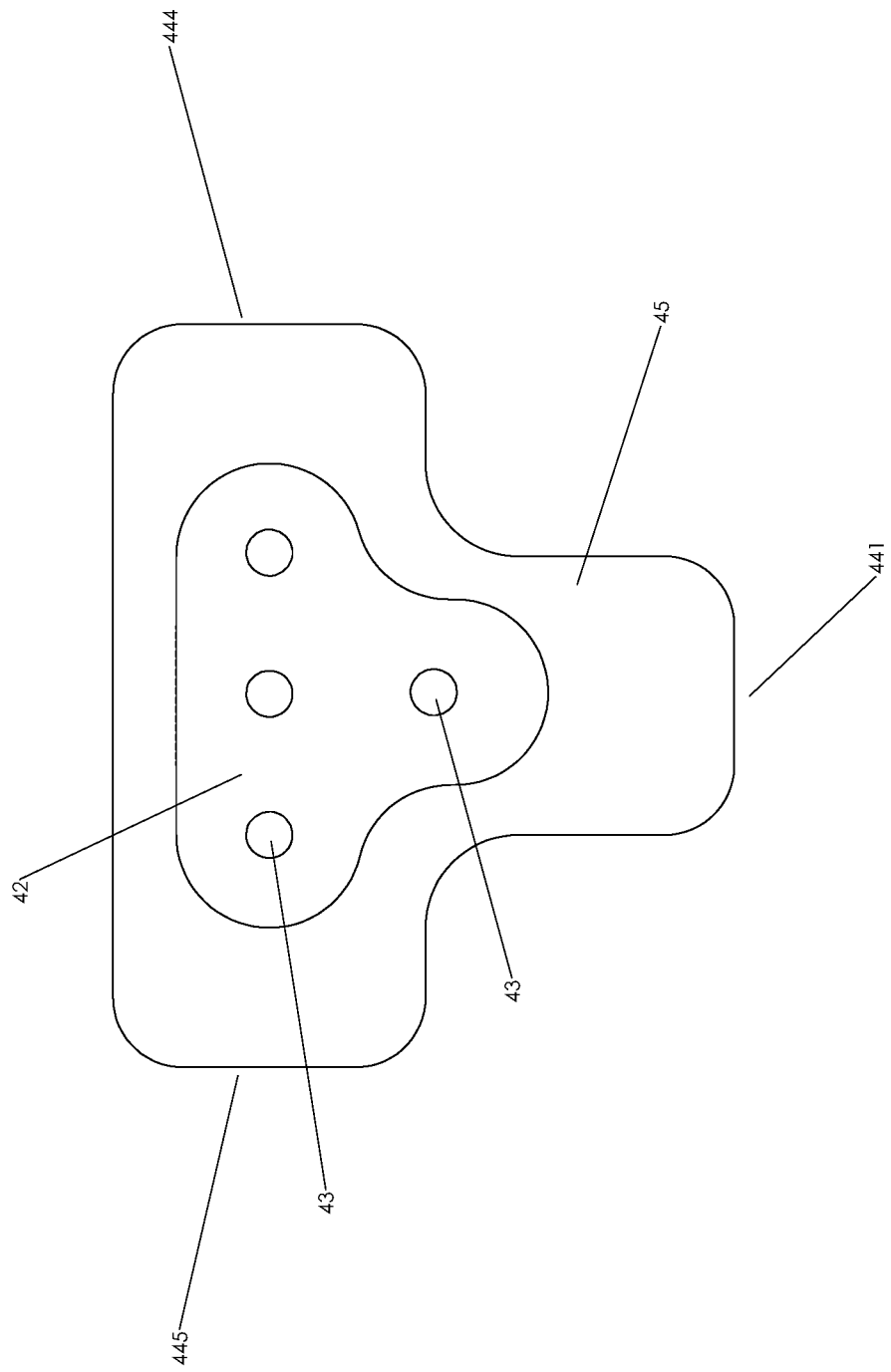
FIG. 11 is a top view of an embodiment of bowl assembly of the device.

As shown in FIG. 10, the bowl assembly 40 can have an internal passageway 442 between the at least one screening hole 43 and the stem port 441. The stem port 441 is shaped to receive the stem assembly on one end and can provide an opening to internal passageway 442. In some embodiments, a back wall 443 provides an irregular surface that creates turbulence assisting with vaporization of smoke being drawn through the pipe 1. In the embodiment shown in FIG. 11, the bowl 42 can have four screening holes 43 spread across the bottom of the bowl 42. In an embodiment such as shown in FIG. 11, the bowl assembly 40 can have an irregular shape to reduce its weight, such as with a stem port 441 at one end and fastener attachments 444, 445 at two other ends to receive the arms 31. The bowl 42 can also be a circle, oval, egg, stadium, rectangle, rounded rectangle, square, or any other shape.

As shown in FIGS. 12, 12.1 and 13, in one embodiment, the pipe 1 comprises an unobstructed airway beginning at the at least one screening hole 43 passing through the internal passageway 442, into the stem port 441, and through the hollow tube 511 inside the stem 51.

In one embodiment, the pipe is made of anodized aluminum, brass, bronze, or stainless steel. In one embodiment, the brass is ASTM B-145 or ASTM B-146. In one embodiment, the brass is 360 for machining. In another embodiment, the stem and body are made of glass. In one embodiment, the lens is made of glass or UV resistant acrylic or another material appropriate for lenses. In one embodiment, the arms are 0.3 inch wide, the bowl assembly is 0.5 inch thick, the bowl assembly is 1 inch wide, and the bowl assembly is 0.8 inch long at its longest part. In one embodiment, the portion of the stem extending from the bowl assembly is 1.9 inches long. In one embodiment, the lens assembly is 1.9 inch wide and 1.8 inch long. In such an embodiment, the lens assembly is slightly wider to allow for the arm attachment points. In one embodiment, the lens is 1.6 inches in diameter. In such an embodiment, the distance between the optical center 211 (see FIG. 12.1) of the lens and the focal area in the bowl is equal to the focal length of the lens. In this embodiment, the focal length is approximately 3 inches. In one embodiment, when folded, the pipe is approximately 4.6 inches long, 0.5 inches thick, and 2.2 inches wide. In one embodiment, the stem is between about 0.25 inch and 0.5 inch in diameter. In one embodiment, the attachment point between the bowl assembly and each of the arms accommodates a 0.2 inch diameter screw to make the device easy to clean when the screw is removed. In one embodiment, the hinges are free moving to prevent the intersection between the arms and the bowl assembly from overheating during use. In such an embodiment, the tolerance of the gap is between about 0.005 inch and 0.02 inch. In one embodiment, when folded, the pipe is approximately the size of a smartphone. In one embodiment, 6 inches by 3 inches by 0.5 inches. In one embodiment, the focal length of the lens is approximately 3 inches. In such an embodiment, the device can easily fold and be carried in an ordinary pants pocket. In one embodiment, any lens with a diameter of between about 1.5 inch and 1.75 inch with a focal point of approximately 3 inches will allow the folded device to remain the same size or smaller than a smartphone. In one embodiment, the lens thickness is around 0.25 of an inch. In one embodiment, the maximum thickness of the bowl assembly is 0.50 inches. In one embodiment, the bowl assembly is long enough and tall enough that it can contain the bowl, the internal passageway, the stem port, and the at least one screening hole and allows room to keep them separated within the bowl assembly. The bowl assembly shape is optimized to minimize the weight and maximize the size of the bowl. In one embodiment, the volume of the bowl is between about 0.02 cubic inch and 0.04 cubic inch. In one embodiment, the depth of the bowl is between about 0.15 inch and 0.10 inch. In one embodiment, the device weighs between about 3 ounces and 4 ounces.

In one embodiment, the lens assembly is a unitary piece and the arms attach directly to the edges of the lens or the lens has a flange around its perimeter to allow room for the arms to attach. In one embodiment, the bowl assembly and stem assembly are formed as a unitary piece so that the stem is part of the bowl assembly. In one embodiment, the arm assembly has a brace extending between the arms so that the arms are connected to one another as well as to the lens assembly and the bowl assembly.

In one embodiment, the pipe comprises a slot, hole or fastener to attach a cleaning pick or tool.

Water Pipe Embodiment

Figure 14:
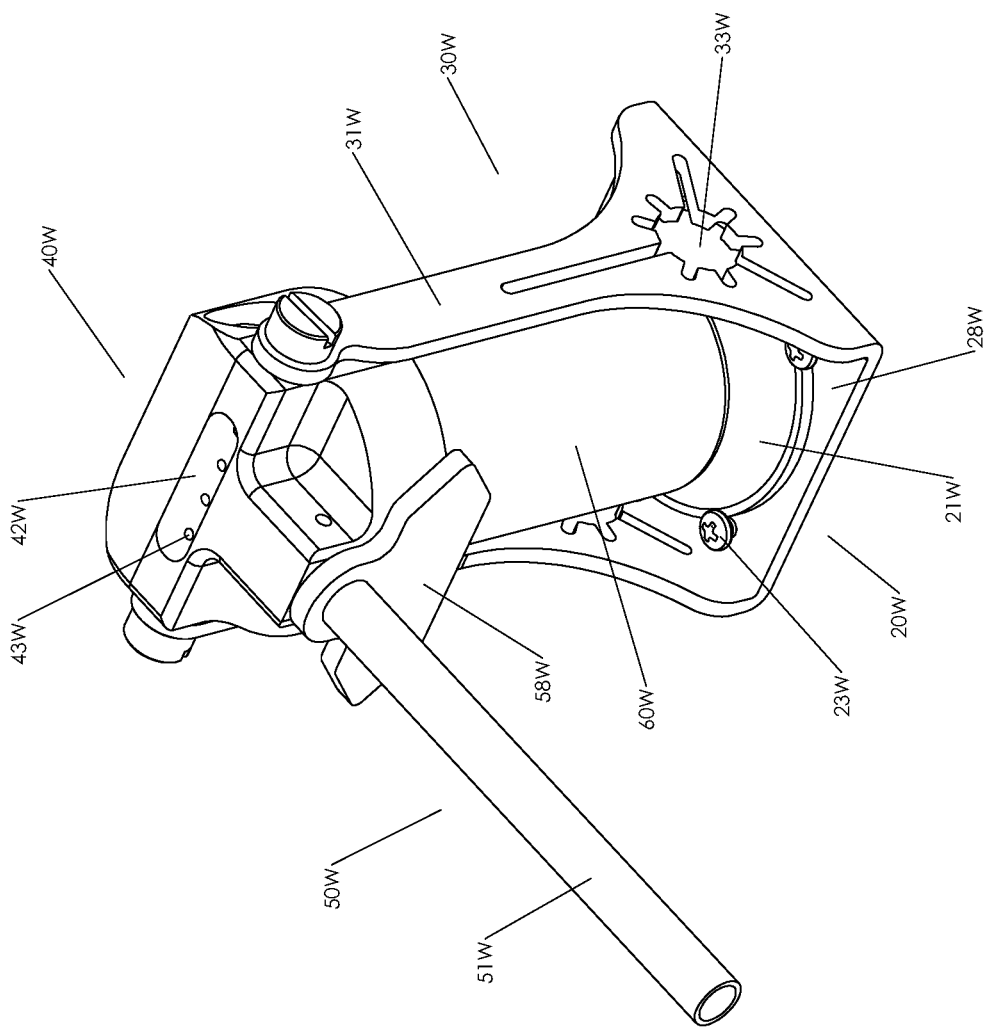
FIG. 14 is a perspective view of an embodiment of the device in a folded position.

In another embodiment, as shown in FIG. 14, the pipe is a water pipe. FIG. 14 shows a folded water pipe with the lens underneath the pipe bowl. In such an embodiment, the pipe comprises a lens assembly 20W, an arm assembly 30W, a bowl assembly 40W, a stem assembly 50W, and a water assembly 60W.

The lens assembly 20W can, in one embodiment, have a lens 21W and in another embodiment have a lens 21W with a frame 28W. As shown in FIG. 14, in one embodiment, the lens 21W is held to the frame 28W by fasteners 23W. The lens 21W is typically a spherical, convex lens. Although multiple lenses can be used, typically, a single lens is sufficient. In the embodiment of FIG. 14, the frame 28W and lens assembly 20W are square-shaped. In other embodiments, the frame and lens assembly 20W can be rectangular, circular, ovular, or any other shape. In one embodiment (not shown), the lens assembly 20W further comprises attachment points on opposite sides of the frame (in an embodiment with a frame) or on opposite sides of the lens (in an embodiment without a frame). In such embodiments, the lens 21W has an optical center, a diameter, and an outer edge. In one embodiment (not shown), the outer edge of the lens has attachment points on opposite sides of the outer edge. In the embodiment (not shown), the frame has attachment sides and non-attachment sides, and attachment points on the attachment sides. In one embodiment (not shown), each side has an edge and the edges of the attachment sides have an attachment points and the edges of the non-attachment sides can be equidistant from the optical center. Alternatively, one or more of the non-attachment sides can be further away from the optical center than the other sides. In one embodiment (not shown), the lens frame sandwiches the lens holding it firmly in place. In the embodiment shown in FIG. 14, a plurality of fasteners 23W attach the lens 21W to the lens frame 28W.

In the embodiment shown in FIG. 14, the arm assembly 30W and lens assembly 20W can be a unitary piece or an integrally formed piece rather than two separate components. In such an embodiment, the arms 31W extend from the lens frame 28W. In such an embodiment, the unitary arm assembly 30W and lens assembly 20W are rotatably connected to the bowl assembly 40W.

In another embodiment (not shown), the arm assembly comprises two arms or swingarms having equal lengths. Each arm has a first end and a second end, and the first end has an attachment point where it rotatably connects to the edge of the lens or to the lens assembly (on the attachment sides of the lens assembly). In such an embodiment, the second end of each arm rotatably connects to the bowl assembly and is held in place by fasteners. A lens fastener can attach the first end of the arms to the lens assembly at the attachment points. In one embodiment, material is removed from the arms 31W to form a decorative pattern 33W and to reduce the weight.

As shown in FIG. 14, in one embodiment, the bowl assembly 40W has a bowl 42W, an internal passageway (not shown), attachment points for the arm assembly, and an attachment point for the stem assembly. In one embodiment, the bowl 42W has a focus area and at least one screening hole 43W. The focus area can vary but is typically between the top surface of the bowl assembly (or the outer rim of the bowl) and the bottom of the bowl. The focus area is a horizontal plane within the bowl at the focal point of the lens. Essentially, the focus area is the spot where the lens focuses the light passing through the lens. The screening hole(s) 43W are small enough that materials placed in the bowl will not fall through the screening holes 43W, but are large enough that air will flow through the screening holes 43W. As shown in FIG. 14, the bowl 42W can be stadium-shaped, but it can also be any other shape. The bowl assembly can have an internal passageway between the at least one screening hole and a stem port. The stem port is shaped to receive the stem assembly on one end and can provide an opening to internal passageway in the bowl assembly. In some embodiments, a back wall in the internal passageway provides an irregular surface that creates turbulence assisting with vaporization of smoke being drawn through the pipe 1. In the embodiment shown in FIG. 14, the bowl 42W can have four screening holes 43W spread across the bottom of the bowl 42W. In an embodiment such as shown in FIG. 14, the bowl assembly 40W can have an irregular shape to reduce its weight with a stem port at one end and receive the stem and fastener ports at two other ends to receive the arms 31W. The bowl 42W can also be a circle, oval, egg, stadium, rectangle, rounded rectangle, square, or any other shape.

As shown in FIG. 14, the stem assembly 50W can be a hollow tube or stem 51W having two ends, a user end that is accessible to a user and a bowl end that attaches to the bowl assembly 40W. In another embodiment, the stem assembly can comprise a tube and a mouthpiece. In some embodiments, a shield 58W can be attached to the stem assembly 50W. In some embodiments the stem assembly and the bowl assembly are a unitary piece rather than being separate components. In one embodiment, the stem 51W slides into the stem port in the bowl assembly 40W.

As shown in FIG. 14, in one embodiment, the water assembly 60W is a water container or vial. As with other water pipes, when in operation, the vial is filled to about ⅔ capacity and the water acts as a water filter (when the air bypass hole 49W is closed) as air is drawn through the stem by a user, and air and smoke are pulled from the water vial through the water and water filter tube from the bowl. In another embodiment, the water assembly comprises a water container and a filter tube (not shown) in communication with the bowl that extends into the water assembly 60W and has an opening inside the water container. When in operation, the open end of the filter tube is submerged in water.

Figure 15:
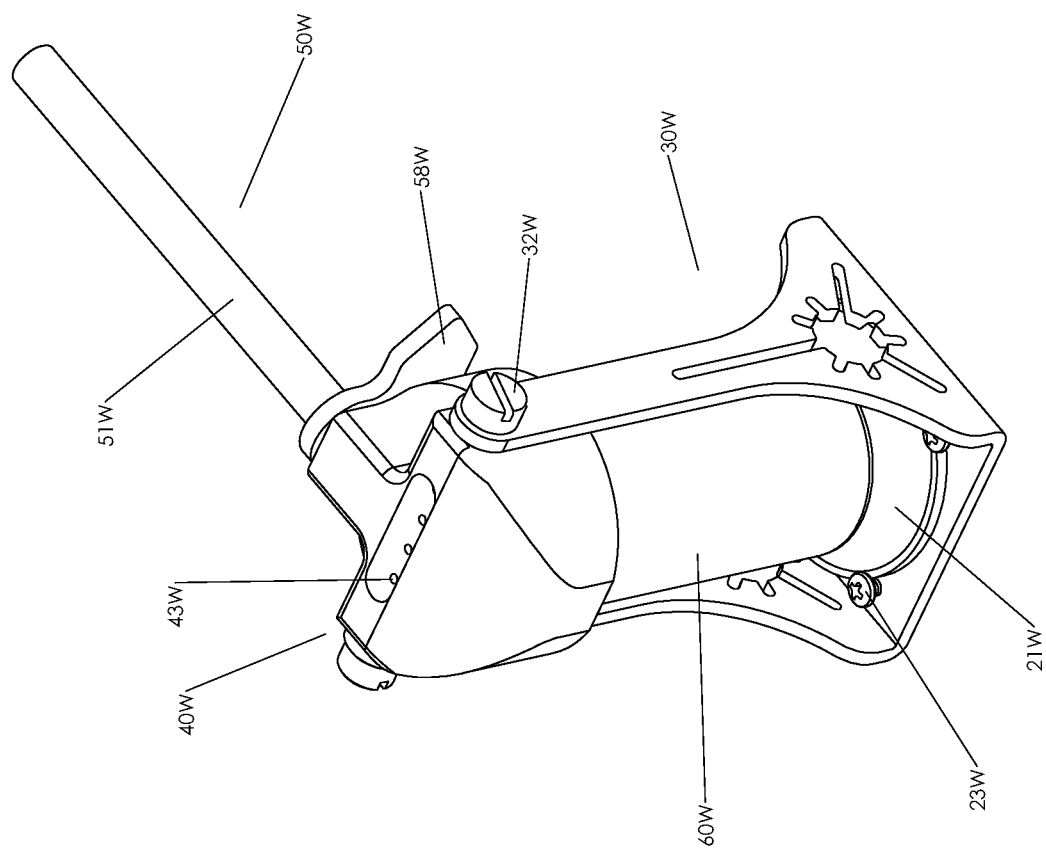
FIG. 15 is a perspective view of an embodiment of the device in a folded position.

FIG. 15 shows the same embodiment as FIG. 14 except that it shows the pipe from the opposite side.

Figure 16:
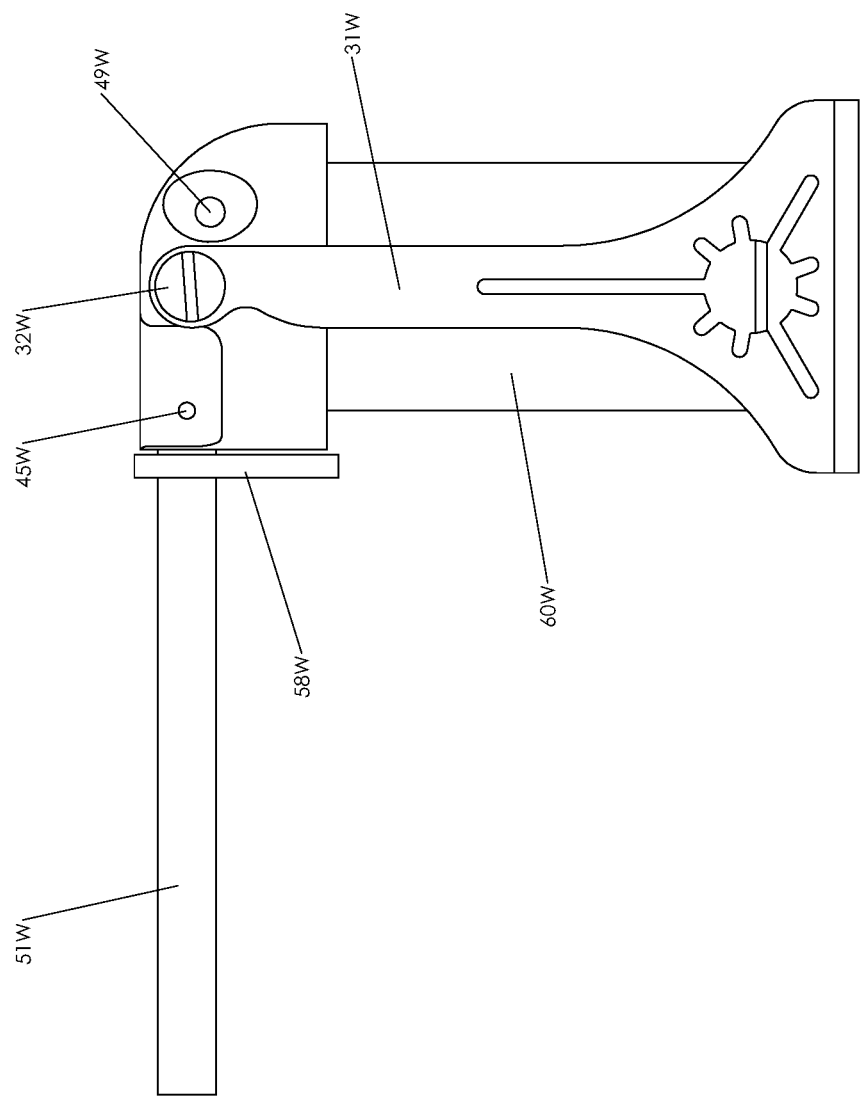
FIG. 16 is side view of an embodiment of the device in a folded position.

FIG. 16 shows the same embodiment as FIG. 14 except the view is a side view. In this embodiment, a fastener hole 45W can be seen that is used to insert a fastener to attach the stem to the bowl assembly. Additionally, an air bypass hole 49W can be seen. This air bypass hole 49W is similar to bypasses found on other water pipes and bongs, and it allows a user to bypass the water chamber and bowl when drawing on the pipe.

Figure 17:
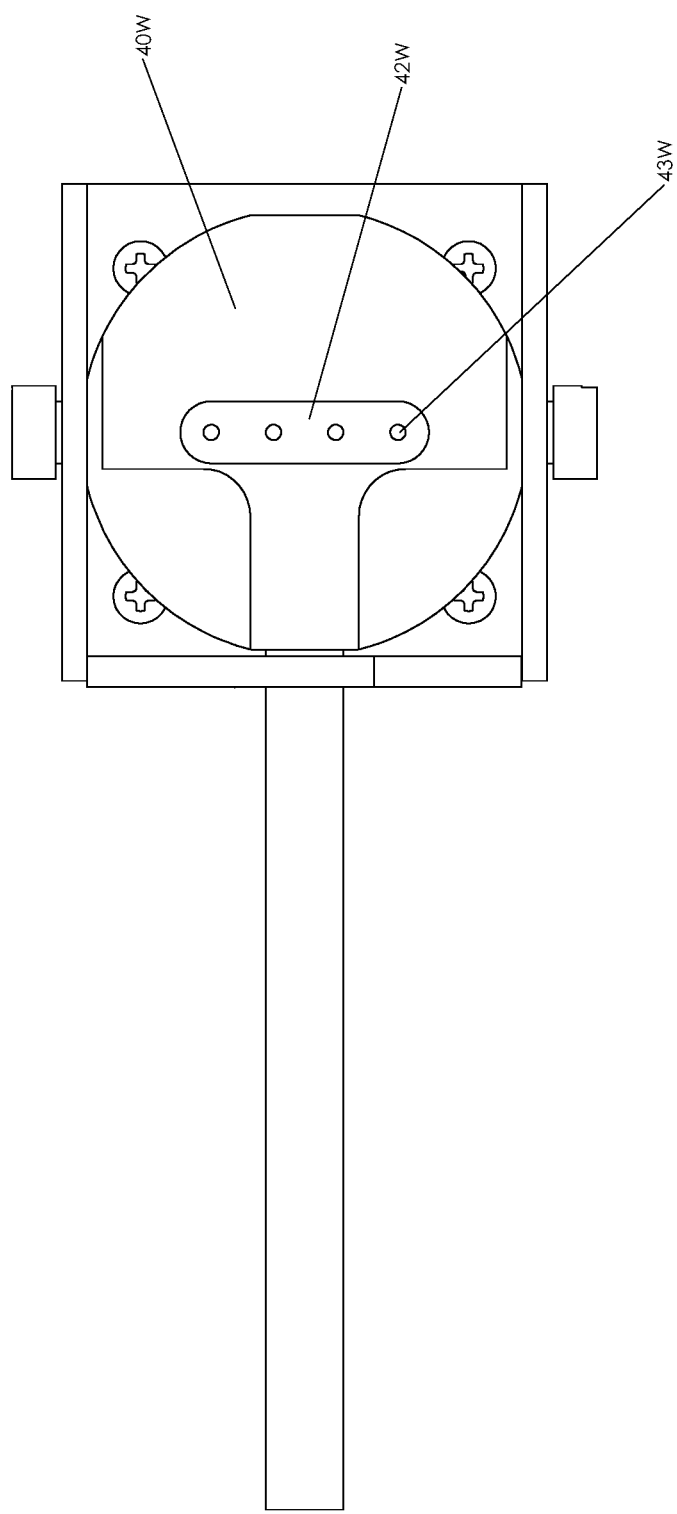
FIG. 17 is a top view of an embodiment of the device in a folded position.

FIG. 17 shows the same embodiment as FIG. 14 except the view is a top view and so the bowl 42W and screening holes 43W can clearly be seen in the bowl assembly 40W.

Figure 18:
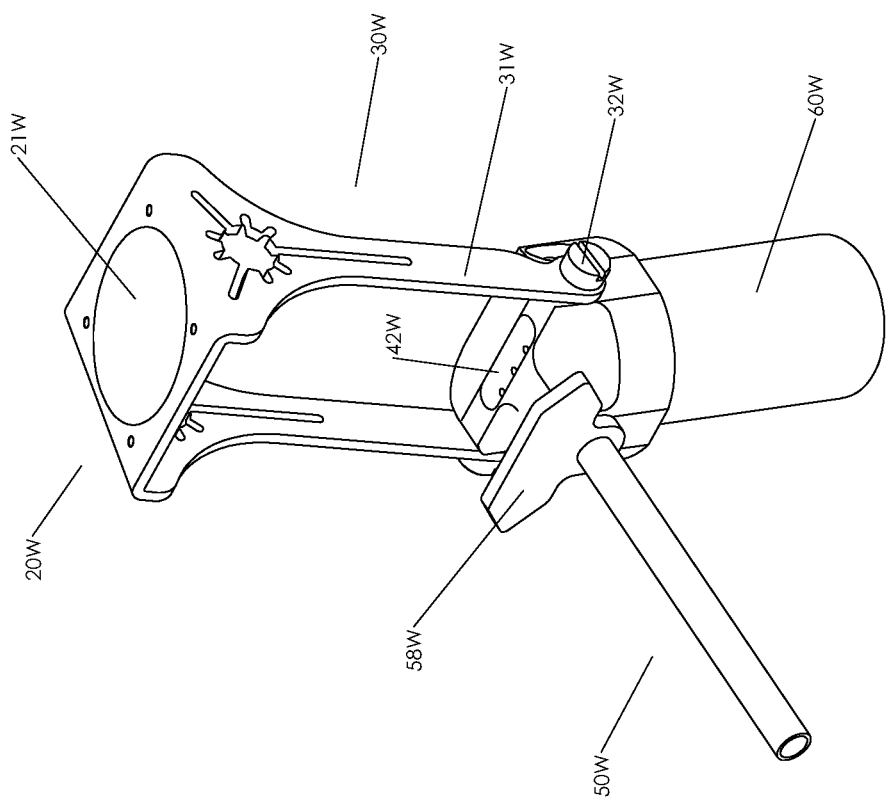
FIG. 18 is perspective view of an embodiment of the device in an unfolded position.

FIG. 18 shows one embodiment of the pipe in an operational position with the lens 21W extended above the bowl 42W. The relationship of the length of the arms is the same as with previous embodiments. In this embodiment, the distance between the focal center of the lens and the focal area of the bowl is equal to the focal length of the lens. Also shown in FIG. 18 is a glare shield 58W that can be used in one embodiment to reduce glare from the lens 21W, when the device is in operation. In one embodiment, the glare shield 58W can be rotated 180 degrees for storage to reduce the profile of the device when not in use.

Figure 19:
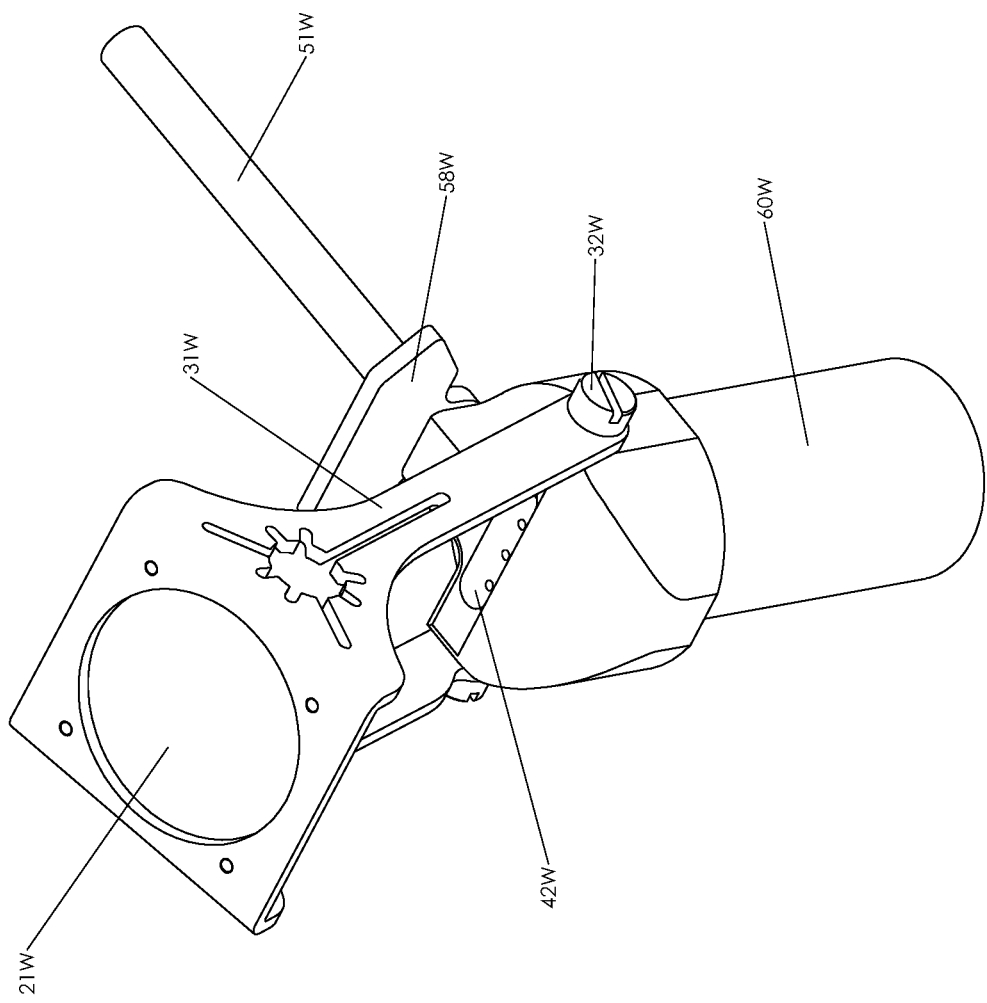
FIG. 19 is perspective view of an embodiment of the device in an unfolded position.
Figure 20:
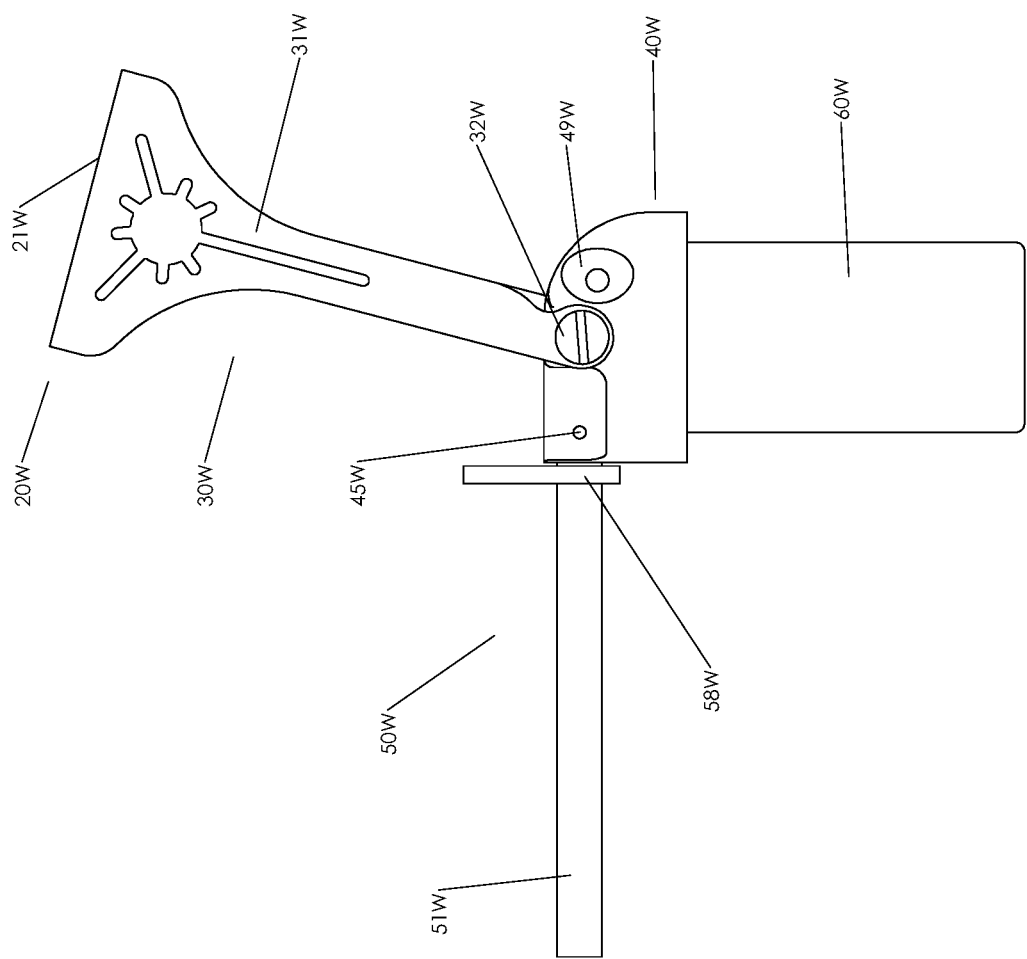
FIG. 20 is a side view of an embodiment of the device in an unfolded position.

FIG. 19 shows an embodiment of the pipe, also in an operational position with the lens 21W extended above the bowl 42W. FIG. 20 shows one embodiment of the pipe in an operational position with the lens 21W extended above the bowl. In an embodiment with a fastener hole 45, a pin, screw or other fastener is inserted into the fastener hole 45 to hold the stem in place in the bowl assembly. As shown in FIG. 20, in an embodiment with a fastener hole 45W and fastener, the stem 51W can be removed from the bowl assembly for cleaning or to replace the stem. In an embodiment where the stem and bowl assembly are a unitary piece, there would be no fastener hole.

Figure 21:
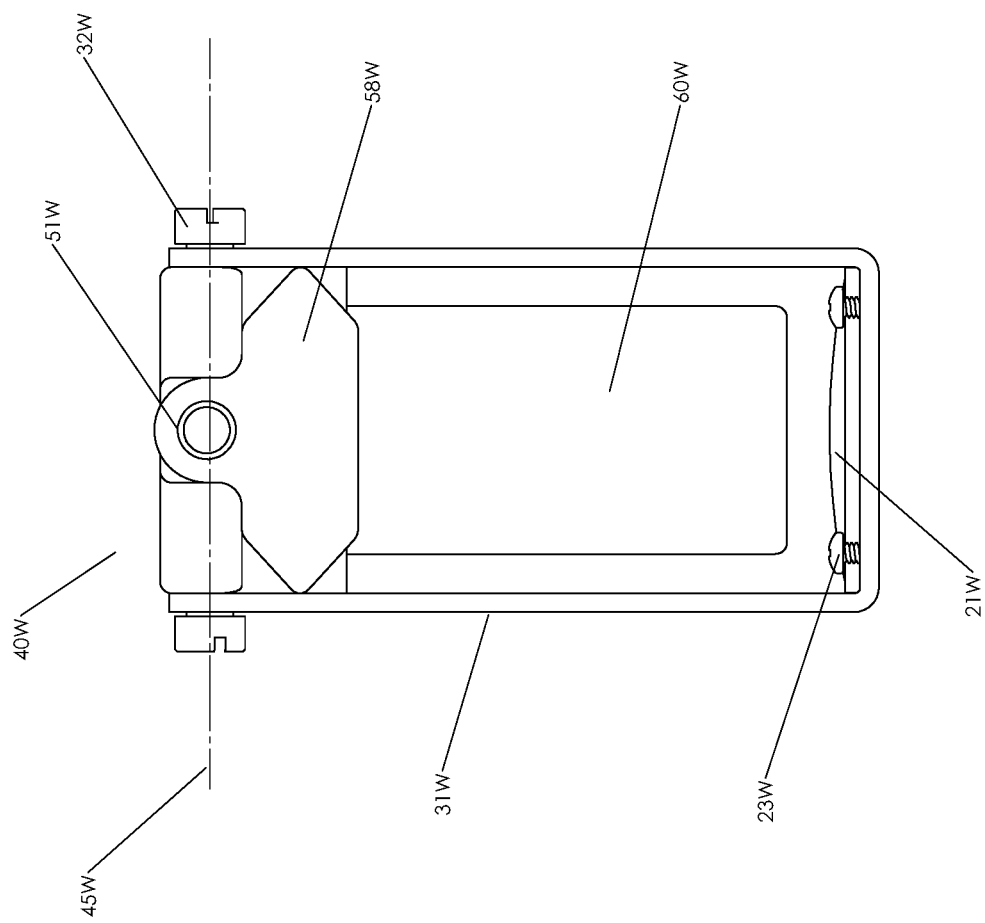
FIG. 21 is front view of an embodiment of the device in a folded position.

FIG. 21 shows one embodiment of the pipe in a folded position. In one embodiment, the arms 31W rotate on an axis around the bowl assembly 40W at the fasteners 32W. In another embodiment (not shown), the lens assembly also rotates on its own axis on fasteners connecting it to the arm assembly. In the folded position, the lens 21W is rotated so that it is underneath the water assembly 60W. In the embodiment shown in FIG. 21, the length of the arms 31W must be greater than the height of the water assembly 60W plus the bowl assembly 40W. In other words, when folded, the lens 21W must be able to swing underneath the water assembly 60W. In such an embodiment, the lens 21W and lens assembly 20W (if any) are roughly the same area as the base of the water assembly 60W and the bowl assembly 40W so that when folded. In another embodiment (not shown) the stem can be unscrewed from or otherwise removed from the bowl assembly so that it does not stick out when the pipe is folded.

As with other embodiments, the embodiment of FIG. 14 comprises an unobstructed airway beginning at the at least one screening hole 43W passing through the internal passageway (not shown), into the stem port (not shown), and through the stem 51W.

In one embodiment, the water pipe is made of anodized aluminum, brass, bronze, or stainless steel. In another embodiment, the stem, water container and body are made of glass. In one embodiment, the lens is made of glass or UV resistant acrylic or another material appropriate for lenses. In one embodiment, the bowl assembly is 0.5 inch thick, the bowl assembly is 2 inches wide, and the bowl assembly is 2 inches long. In one embodiment, the portion of the stem extending from the bowl assembly is 3.3 inches long. In one embodiment, the lens assembly is 2 inches wide and 2 inches long. In such an embodiment, the lens assembly is slightly wider to allow for the arm attachment points. In one embodiment, the lens is 1.6 inches in diameter. In such an embodiment, the distance between the optical center of the lens and the bowl is the focal length of the lens, e.g, approximately 3 inches. In one embodiment, when folded, the pipe (excluding the stem) is approximately 3.9 inches long, 2.4 inches wide, and 2 inches wide. In one embodiment, the stem is removable from the bowl assembly. In one embodiment, the stem is between about 0.25 inch and 0.5 inch in diameter.

Alternate Embodiments of Compact Pipe

Figure 22:
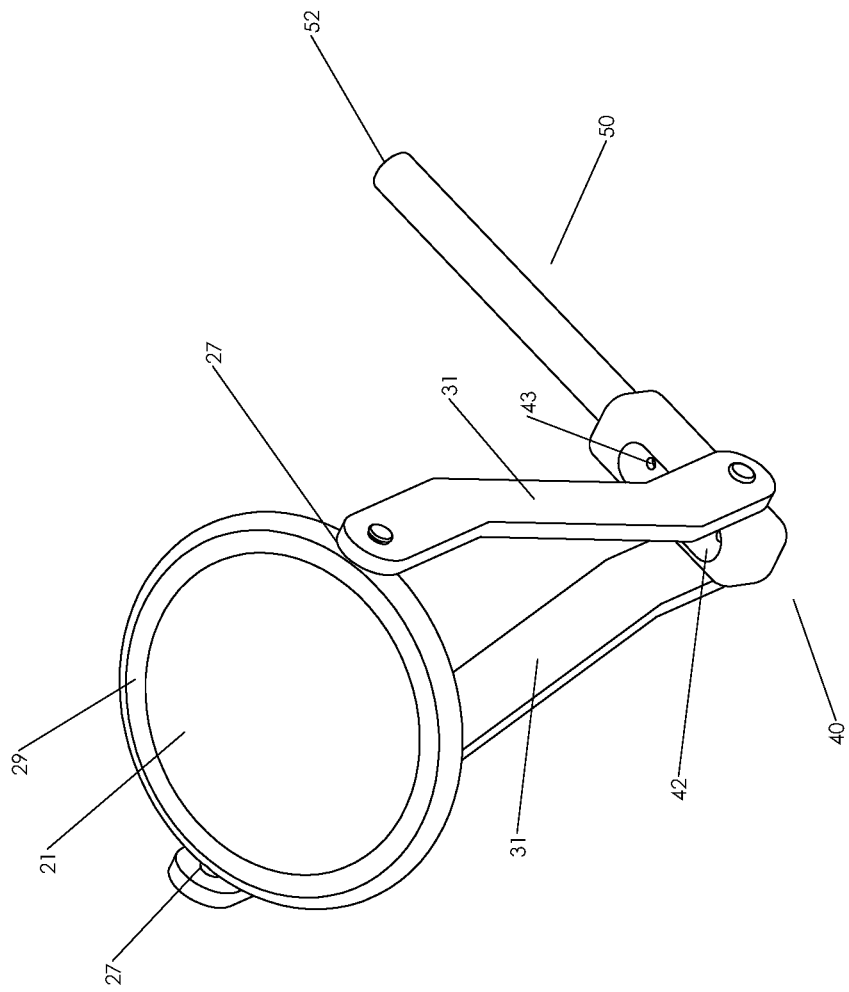
FIG. 22 is a perspective view of an embodiment of the device in an unfolded position.
Figure 23:
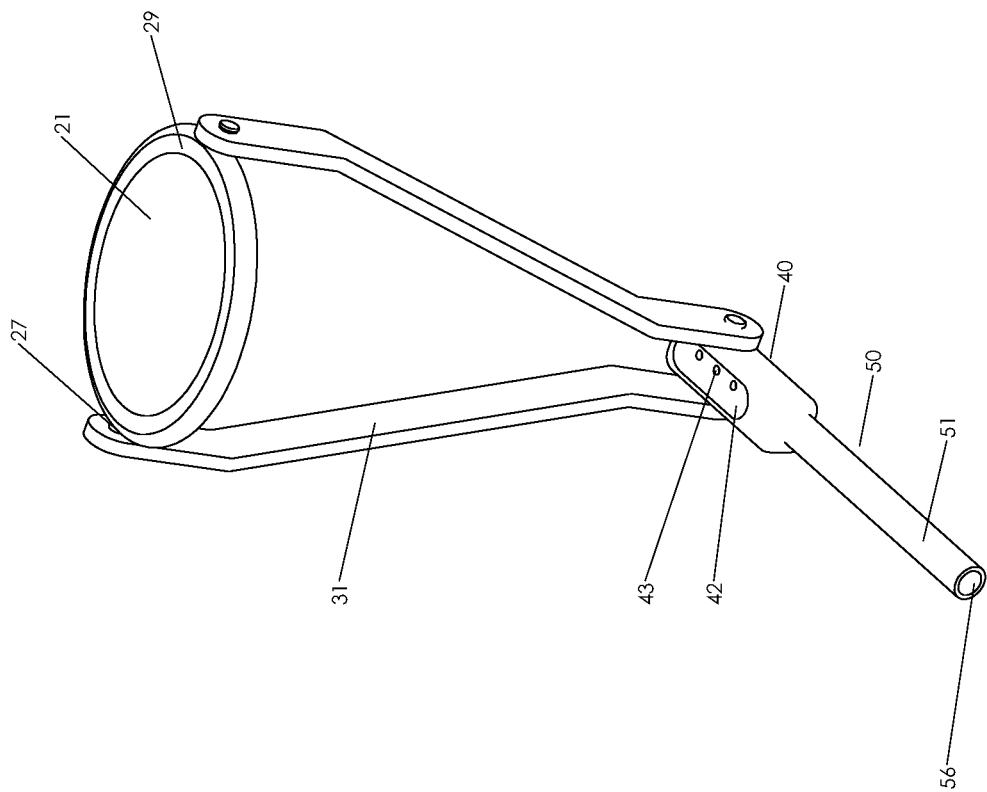
FIG. 23 is a perspective view of an embodiment of the device in an unfolded position.
Figure 24:
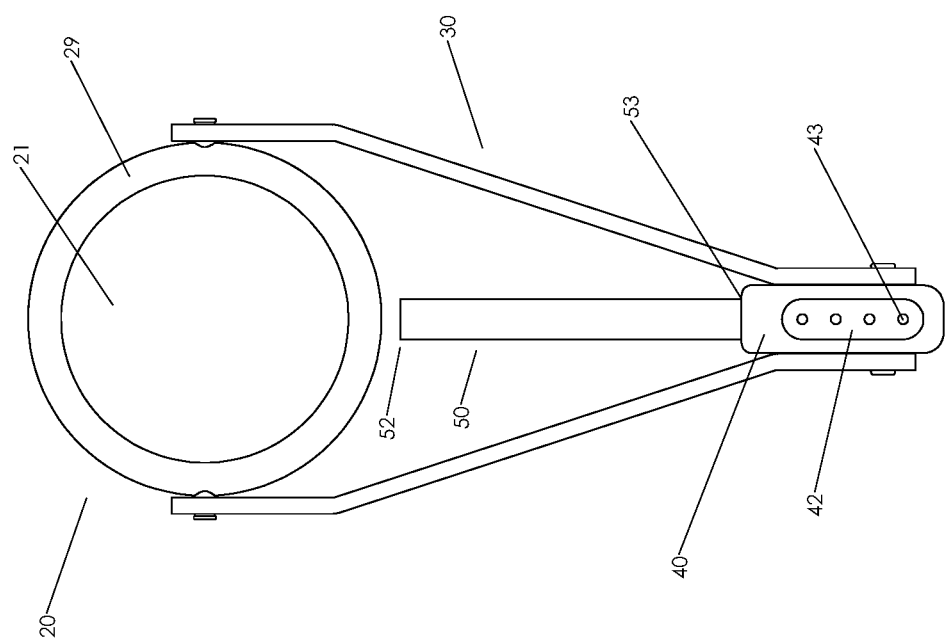
FIG. 24 is a top view of an embodiment of the device in a folded position.

FIGS. 22-24 show another embodiment of a compact pipe. In this embodiment, the lens 21 is held by a frame that is molded to the shape of the lens 21. Alternatively, the lens 21 can be constructed with a flanged edge rather than a frame. The arms 31 attach to the lens 21 or the lens frame 29 on one end and to the bowl housing 40 on the other end. In one embodiment, the bowl and stem are formed from a unitary piece. In one embodiment, the bowl 42 is stadium shaped but it can be any shape. In one embodiment, the arms 31 attach to the body assembly 40 near the bowl so that the focal point of the lens 21 when the lens is extended in an operation position, the lens focuses light inside the bowl. As with other compact embodiments, the length of the arms 31 is greater than one half the diameter of the lens plus the distance between the user end of the stem to the bowl assembly's arm attachment points, so that the pipe can fold flat for storage. As with other embodiments, the extended arms hold the lens a distance from the bowl that is equal to the focal length of the lens.

Figure 25:
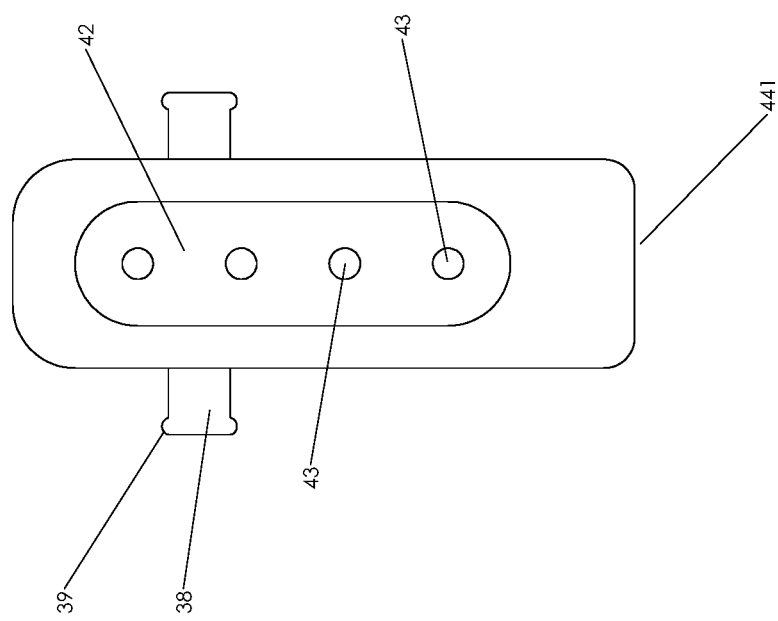
FIG. 25 is a top view of an embodiment of the bowl assembly of the device.
Figure 26:
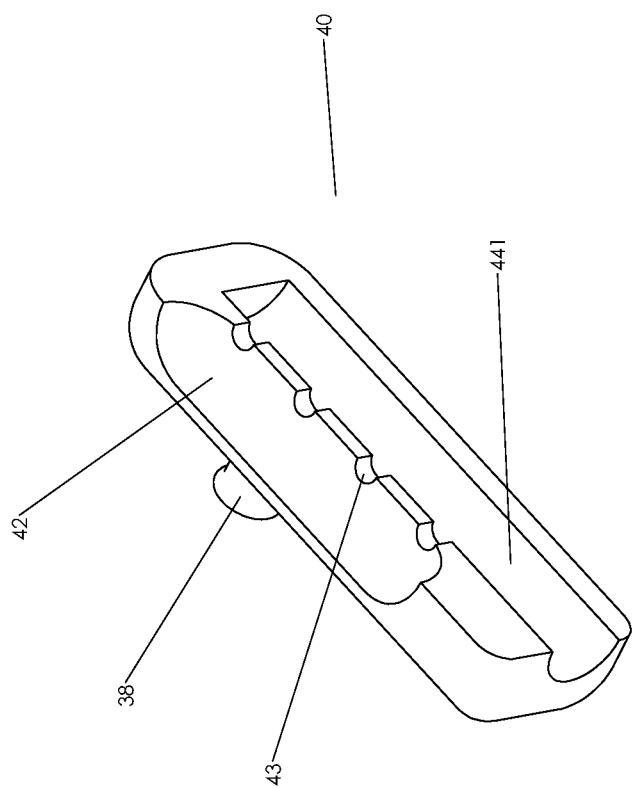
FIG. 26 is a cutaway view of an embodiment of the bowl assembly of the device.

FIGS. 25 and 26 show the bowl assembly of a compact embodiment of the pipe sharing the same structural components as FIGS. 1 and 10, but in a more compact configuration. In one embodiment, as shown in FIG. 25, the bowl assembly has axle protrusions 38 extending from its sides and each axle protrusion 38 can have a flange or lip boss so that arms 31 can be snapped on to the axle without the need for a separate fastener. In other embodiments, the lens assembly can have similar axle protrusions (with or without flanges) so that the arms can be snapped directly on the lens assembly. In such an embodiment, an elastomer material can be used for the arms so that they can stretch slightly to snap onto the axle protrusions and then remain firmly attached once connected.

A compact embodiment of the device comprises a lens assembly, a bowl assembly, and an arm assembly; the lens assembly has a lens and an outer edge; the bowl assembly has a bowl, an integrated stem, an internal passageway, attachment points for the arm assembly, a focus area in the bowl, and at least one screening hole; the arm assembly has at least two swingarms, each swingarm having a first end and a second end; the integrated stem having a hollow tube with a user end; the first end of each swingarm is rotatably connected to the lens assembly at the outer edge of the lens, and the second end of each swingarm is rotatably connected to the bowl assembly. In such an embodiment, the lens assembly rotates on the two swingarms around the bowl with the lens held at fixed distance from the bowl. In such an embodiment, there is an unobstructed airway extending from the bowl, through the at least one screening hole, through the bowl assembly's internal passageway, and through the stem.

Larger Embodiments of the Device

In one embodiment, the device is much larger but remains foldable for easier transportation and storage. For example, if the device is a large hookah pipe, it would be fitted with larger arms, a larger bowl, and a larger lens. A larger device may have a tube rather than a stem, and the device may be a water pipe or a non-water pipe. In a larger embodiment of a water pipe, the pipe comprises a lens assembly, an arm assembly, a bowl assembly, a stem assembly, and, optionally, a water assembly.

The lens assembly can, in one embodiment, have a lens and in another embodiment have a lens with a frame. In one embodiment, the lens is held to the frame by fasteners. The lens is typically a spherical, convex lens. Although multiple lenses can be used, typically, a single lens is sufficient. In one embodiment, the lens assembly further comprises attachment points on opposite sides of the frame (in an embodiment with a frame) or on opposite sides of the lens (in an embodiment without a frame). In such embodiments, the lens has an optical center, a diameter, and an outer edge. In one embodiment, the outer edge of the lens has attachment points on opposite sides of the outer edge. In the embodiment, the frame has attachment sides and non-attachment sides, and attachment points on the attachment sides. In one embodiment, each side has an edge and the edges of the attachment sides have an attachment points and the edges of the non-attachment sides can be equidistant from the optical center. Alternatively, one or more of the non-attachment sides can be further away from the optical center than the other sides. In one embodiment, the lens frame sandwiches the lens holding it firmly in place. Even in larger embodiments, the arm assembly and lens assembly can be a unitary piece or an integrally formed piece rather than two separate components. In such an embodiment, the arms extend from the lens frame. In such an embodiment, the unitary arm assembly and lens assembly are rotatably connected to the bowl assembly. In a large embodiment, the arm assembly comprises two arms or swingarms having equal lengths. Each arm has a first end and a second end, and the first end has an attachment point where it rotatably connects to the edge of the lens or to the lens assembly. In such an embodiment, the second end of each arm rotatably connects to the bowl assembly and is held in place by fasteners. A lens fastener can attach the first end of the arms to the lens assembly at the attachment points. In a larger embodiment, the bowl assembly has a bowl, an internal passageway, attachment points for the arm assembly, and an attachment point for the stem assembly. In one embodiment, the bowl has a focus area and at least one screening hole. The focus area can vary but is typically between the top surface of the bowl assembly (or the outer rim of the bowl) and the bottom of the bowl. The focus area is a horizontal plane within the bowl at the focal point of the lens. The screening hole(s) are small enough that materials placed in the bowl will not fall through the screening holes, but are large enough that air will flow through the screening holes. The bowl assembly can have an internal passageway between the at least one screening hole and a stem port. The stem port is shaped to receive the stem assembly on one end and can provide an opening to internal passageway in the bowl assembly. In some embodiments, a back wall in the internal passageway provides an irregular surface that creates turbulence assisting with vaporization of smoke being drawn through the device. The stem assembly can be a hollow tube or stem, or in some embodiments, a flexible tube or hose, having two ends, a user end that is accessible to a user and a bowl end that attaches to the bowl assembly. In one embodiment, the device comprises a mouthpiece. In one embodiment, the water assembly is a water container or vial and a water filter tube. As with other water pipes, when in operation, the vial is filled to about ⅔ capacity and the water acts as a water filter (when the air bypass hole is closed) as air is drawn through the stem by a user, and air and smoke are pulled from the water vial through the water and water filter tube from the bowl. In another embodiment, the water assembly comprises a water container and a filter tube in communication with the bowl that extends into the water assembly and has an opening inside the water container. When in operation, the open end of the filter tube is submerged in water.

Even in a larger embodiment, the arms swing or rotate between a folded or unfolded position to reduce the overall size of the device when not in use. The mouthpiece, stem, or hose can be removed. When the device is unfolded into the operation position, the lens remains a distance equal to the focal length of the lens away from the focal area in the bowl without any need for calibration.

Using the Device

In one method of using the folded compact pipe of one of the embodiments described above, a user swivels the stem out of the folded position so that the rim of the bowl is facing upwards. The user then places a combustible substrate into the pipe, specifically into the bowl of the pipe. While holding pipe (by either the arm assembly, the bowl assembly or the stem), the user rotates the lens assembly on the bowl assembly's axis to a position higher than the bowl. The arms keep the lens at fixed distance between the focus area of the bowl and the lens' optical center. As long as the lens is higher than the bowl, the focal point of the lens is focused on the focus area in the bowl, regardless of the position of the lens. The user then aligns the lens with the sun and focuses the sunlight on the substrate in the bowl. The user then sucks air through the stem's user opening, which pulls air through the unobstructed airway extending through the bowl, through the at least one screening hole, through the bowl assembly's internal passageway, and through the stem. As the user draws air through the stem, air is fed into the bowl and assists the lens in igniting the substrate. Once the substrate is ignited, the user continues to draw smoke through the pipe. When the user if finished, the stem can be rotated inward until it is parallel to the arm assembly and the lens can be rotated so that it is also horizontal to the arm assembly. Once both the bowl assembly and the lens assembly are rotated parallel to the arm assembly, the device is folded. If the user end of the stem is pointing toward the edge of the lens in the folded position, then the pipe is in a folded, compact position.

One method of using one embodiment of the pipe comprises placing a combustible substrate into a pipe, specifically into the bowl of the pipe while holding the bowl facing upwards, extending the lens assembly above the bowl of the pipe by rotating pipe's swingarms; positioning the lens toward the sun so that the lens focuses the light from the sun on the substrate in the bowl; heating the substrate using the lens; and drawing air through a stem of a pipe. The pipe used in such method, in one embodiment comprising: a lens assembly, a bowl assembly, an arm assembly, and a stem assembly; the lens assembly having a lens, and the lens further comprising an optical center, a diameter, and an outer edge; the bowl assembly having a bowl, an internal passageway, attachment points for the arm assembly, and an attachment point for the stem assembly, and the bowl further comprising a focus area and at least one screening hole; the arm assembly having two swingarms, each swingarm having a first end and a second end; the stem assembly having a hollow tube with a user end and a bowl end; the first end of each swingarm is rotatably connected to the lens assembly at the edge of the lens, the second end of each swingarm is rotatably connected to the bowl assembly, and the stem assembly's bowl end is attached to the bowl assembly; wherein, the lens assembly rotates on an axis around the bowl assembly at fixed distance between the focus area of the bowl and the lens' optical center; and wherein, there is an unobstructed airway extending through the bowl, the at least one screening hole, the bowl assembly's internal passageway, and the stem.

One method of using an embodiment of the device that is a water pipe involves the additional step of blocking an air bypass hole before inhaling and drawing air through the bowl, through the passageway inside the bowl assembly, through a water filter tube, through water in the water container, through the water container, and out through the stem of the device into a user's mouth. The method of using an embodiment of the device that is a water pipe can also include opening the air bypass to allow smoke to clear the water container easily.

In the foregoing description, it will be readily appreciated by those skilled in the art that modifications may be made to the invention without departing from the concepts disclosed herein. Such modifications are to be considered as included in the following claims, unless the claims by their language expressly state otherwise.

What is claimed is:

1. A smoking device comprising:
a lens assembly, a bowl assembly, an arm assembly, and a stem assembly;
the lens assembly having a lens and an outer edge, and the lens further comprising an optical center;
the bowl assembly having a bowl, an internal passageway, attachment points for the arm assembly, and an attachment point for the stem assembly, and the bowl further comprising a focus area and at least one screening hole;
the arm assembly having two swingarms, each swingarm having a first end and a second end;
the stem assembly having a hollow tube with a user end and a bowl end;
the first end of each swingarm is rotatably connected to the lens assembly at the outer edge, the second end of each swingarm is rotatably connected to the bowl assembly, and the stem assembly's bowl end is attached to the bowl assembly;
wherein, the lens assembly rotates on an axis around the bowl assembly at fixed distance between the focus area of the bowl and the lens' optical center; and
wherein, there is an unobstructed airway extending from the bowl, through the at least one screening hole, through the bowl assembly's internal passageway, and through a stem of the stem assembly;
the lens further comprising a focal length, wherein the fixed distance between the lens' optical center and the bowl's focus area is equal to the lens' focal length.

2. The smoking device of claim 1, further wherein, the lens assembly rotates at least 180 degrees around the axis.

3. The smoking device of claim 1, the lens further comprising a radius, and each of the swingarms further comprising an attachment point at the first end, an attachment point at the second end, and a distance between the attachment points at the first end and the second end, wherein the distance between the attachment point is greater than the radius of the lens plus the length of the stem, and further wherein the stem assembly and the lens assembly fold flat in between the swingarms.

4. The smoking device of claim 1, the lens assembly further comprising a frame holding the lens.

5. The smoking device of claim 1, further wherein the device folds flat when the lens assembly, bowl assembly, and stem assembly are rotated parallel to the arm assembly.

6. A smoking device comprising:
a lens assembly, a bowl assembly, an arm assembly, and a stem assembly;
the lens assembly having a lens, the lens further comprising an optical center;
the bowl assembly having a bowl, an internal passageway, attachment points for the arm assembly, and an attachment point for the stem assembly, and the bowl further comprising a focus area and at least one screening hole;
the arm assembly having two arms, each arm having a first end and a second end;
the stem assembly having a hollow tube with a user end and a bowl end;
the first end of each arm is connected to the lens assembly, the second end of each arm is rotatably connected to the bowl assembly, and the stem assembly's bowl end is attached to the bowl assembly;
wherein, the lens assembly rotates on an axis around the bowl assembly maintaining a fixed distance between the focus area of the bowl and the lens' optical center; and
wherein, there is an unobstructed airway extending through the bowl, the at least one screening hole, the bowl assembly's internal passageway, and a stem of the stem assembly
the lens further comprising a focal length, wherein the fixed distance between the lens' optical center and the bowl's focus area is equal to the lens' focal length.

7. The smoking device of claim 6, further wherein, the lens assembly rotates at least 180 degrees around the axis.

8. The smoking device of claim 6, the lens assembly further comprising a frame, attachment points, and non-attachment sides, wherein the attachment points are positioned opposite from non-attachment sides, and the non-attachment sides having edges.

9. The smoking device of claim 8, further comprising a first distance between the arm attachment points of the bowl assembly and the axis of the lens assembly
and a second distance between the axis of the lens assembly and an edge of the frame, and
a third distance between the attachment points of the bowl assembly and the user end of the stem, wherein the first distance is greater than sum of the second distance and the third distance, and further wherein, the stem assembly and the lens assembly fold flat in between the two arms of the arm assembly.

10. The smoking device of claim 6, further wherein the device folds flat when the lens assembly, bowl assembly, and stem assembly are rotated parallel to the arm assembly.

11. The smoking device of claim 6, further comprising a water filter tube and a water container attached to the bowl assembly.

12. A smoking device comprising:
a lens, a bowl assembly, and an arm assembly;
the lens having a lens and an outer edge;
the bowl assembly having a bowl, an integrated stem, an internal passageway, attachment points for the arm assembly, a focus area in the bowl, and at least one screening hole;
the arm assembly having two swingarms, each swingarm having a first end and a second end;
the integrated stem having a hollow tube with a user end;
the first end of each swingarm is rotatably connected to the outer edge of the lens, and the second end of each swingarm is rotatably connected to the bowl assembly;
wherein, the lens rotates on the two swingarms around the bowl with the lens held at a fixed distance from the bowl; and
wherein, there is an unobstructed airway extending from the bowl, through the at least one screening hole, through the bowl assembly's internal passageway, and through the stem;
the lens further comprising a focal length, wherein the fixed distance between the lens' optical center and the bowl's focus area is equal to the lens' focal length.

13. The smoking device of claim 12, further comprising a lens assembly wherein, the lens assembly rotates at least 180 degrees around the bowl assembly.

14. The smoking device of claim 12, the lens further comprising a radius and attachment points for the swingarms and the device further comprising: a first distance between the attachment points of the bowl assembly and the attachment points of the lens, a second distance equal to the radius of the lens, and a third distance equal to the distance between the attachment points of the bowl assembly and the user end of the stem, wherein the first distance is greater than sum of the second distance and the third distance, and further wherein, the integrated stem and the lens fold flat in between the swingarms.

15. The smoking device of claim 12, further comprising a lens assembly the lens assembly further comprising a frame holding the lens.

16. The smoking device of claim 12, further wherein the device folds flat when the lens assembly, bowl assembly, and integrated stem are rotated parallel to the arm assembly.

17. A method of using a smoking device, the method comprising: Placing a combustible substrate into a smoking device, specifically into a bowl of the smoking device, the smoking device comprising:
a lens assembly, a bowl assembly, and an arm assembly;
the lens assembly having a lens and an outer edge;
the bowl assembly having the bowl, an integrated stem, an internal passageway, attachment points for the arm assembly, a focus area in the bowl, and at least one screening hole;
the arm assembly having two swingarms, each swingarm having a first end and a second end;
the integrated stem having a hollow tube with a user end;
the first end of each swingarm is rotatably connected to the lens assembly at the outer edge of the lens, and the second end of each swingarm is rotatably connected to the bowl assembly;
wherein, the lens assembly rotates on the two swingarms around the bowl with the lens held at fixed distance from the bowl; and
wherein, there is an unobstructed airway extending from the bowl, through the at least one screening hole, through the bowl assembly's internal passageway, and through the stem;
the lens further comprising a focal length, wherein the distance between the lens' optical center and the bowl's focus area is equal to the lens' focal length:
Extending the lens assembly above the bowl of the smoking device by rotating the smoking device's swingarms;
Positioning the lens toward the sun so that the lens focuses the light on the substrate in the bowl; and
Drawing air through a stem of the smoking device.

18. The method of using a smoking device of claim 17, further wherein the airway leads to a water filter comprising a water filter tube and a container of water before the stem.

\* \* \* \* \*